(12) United States Patent
Yakuwa

(10) Patent No.: US 10,210,070 B2
(45) Date of Patent: Feb. 19, 2019

(54) MODEL CHECKING APPARATUS, MODEL CHECKING METHOD, AND STORAGE MEDIUM

(71) Applicant: NEC CORPORATION, Tokyo (JP)

(72) Inventor: Yutaka Yakuwa, Tokyo (JP)

(73) Assignee: NEC CORPORATION, Minato-Ku, Tokyo (JP)

(*) Notice: Subject to any disclaimer, the term of this patent is extended or adjusted under 35 U.S.C. 154(b) by 11 days.

(21) Appl. No.: 15/524,316

(22) PCT Filed: Nov. 12, 2015

(86) PCT No.: PCT/JP2015/005658
§ 371 (c)(1),
(2) Date: May 4, 2017

(87) PCT Pub. No.: WO2016/079962
PCT Pub. Date: May 26, 2016

(65) Prior Publication Data
US 2018/0293151 A1    Oct. 11, 2018

(30) Foreign Application Priority Data
Nov. 17, 2014    (JP) .................................. 2014-232865

(51) Int. Cl.
*G06F 9/44*    (2018.01)
*G06F 11/36*    (2006.01)

(52) U.S. Cl.
CPC ................................ *G06F 11/3608* (2013.01)

(58) Field of Classification Search
CPC ........................................................ G06F 9/44
(Continued)

(56) References Cited

U.S. PATENT DOCUMENTS 6,074,426 A * 6/2000 Baumgartner .............................. G01R 31/318357
703/13
7,216,318 B1 * 5/2007 Siarkowski ......... G06F 17/5031
716/104

(Continued)

FOREIGN PATENT DOCUMENTS

JP    2011-13792 A    1/2011
WO    2014/168164 A1    10/2014

OTHER PUBLICATIONS

Yutaka Yukawa et al., "Model Checking of Open Flow Network with Abstraction of Packets Based on Symbolic Execution", IEICE Technical Report, the Institute of Electronics, Information and Communication Engineers, Jul. 11, 2013, pp. 107-112, vol. 113, No. 140.

(Continued)

*Primary Examiner* — Jae U Jeon
(74) *Attorney, Agent, or Firm* — Sughrue Mion, PLLC

(57) ABSTRACT

A model checking apparatus able to reduce redundant search in a model checking is provided. The model checking apparatus is configured to: accept verification information representing a state transition model and a verification content; obtain an execution path by causing a transition in the state transition model; analyze, between transitions on the execution path, a dependence relation relating to data set determination processing for determining a data set being a set of representative values of data used in a transition with data use; perform a re-search using a data set in which data already used in a previous search in the transition is excluded from the data set obtained by the data set determination processing, when performing a re-search from a backtrack point based on the dependence relation relating to the data set determination processing; and provide a verifi- (Continued)

cation result of the verification content based on the search result.

7 Claims, 18 Drawing Sheets

(58) Field of Classification Search
USPC .................................................. 717/124–128
See application file for complete search history.

(56) References Cited

U.S. PATENT DOCUMENTS

| | | | |
|---|---|---|---|
| 2008/0312890 A1* | 12/2008 | Zhu | G06F 8/10 |
| | | | 703/6 |
| 2009/0282288 A1 | 11/2009 | Wang et al. | |
| 2015/0074652 A1* | 3/2015 | Chockler | G06F 11/3608 |
| | | | 717/126 |
| 2016/0072769 A1 | 3/2016 | Yukuwa et al. | |

OTHER PUBLICATIONS

Marco Canini et al., "A NICE Way to Test OpenFlow Applications", Proc. of NSDI, 2012.
Cormac Flanagan et al.: "Dynamic Partial-Order Reduction for Model Checking Software", Proc. of POPL '05, Jan. 12-14, 2005, pp. 110-121.
Maysam Yabandeh et al., "DPOR-DS: Dynamic Partial Order Reduction in Distributed Systems", EPFL Technical Report NSL-Report-2009-005, 2009.
International Search Report for PCT/JP2015/005658, dated Feb. 2, 2016.

* cited by examiner

MODEL CHECKING APPARATUS, MODEL CHECKING METHOD, AND STORAGE MEDIUM

CROSS REFERENCE TO RELATED APPLICATIONS

This is a National Stage of International Application No. PCT/JP2015/005658 filed Nov. 12, 2015, claiming priority based on Japanese Patent Application No. 2014-232865 filed Nov. 17, 2014, the contents of all of which are incorporated herein by reference in their entirety.

TECHNICAL FIELD

The present invention relates to a technique for executing verification with a state transition model.

BACKGROUND ART

Over recent years, systems and software become more complicated, and their sizes are increasing. A verification method based on model checking is applied as one method for solving the increase in the complication and size. The model checking is a technique for creating a model that represents a verification object as a state transition system, and verifying whether the verification object satisfies specifications by comprehensively searching the state transition in the model. The model checking is applicable in a design stage and able to be applied to guarantee whether the verification object satisfies specifications. Therefore, the model checking is known as a noticeable technique for enhancing reliability of systems and software. Further, recently, the model checking is being attempted to be applied to verification of networks.

NPL 1, for example, discloses a technique for verifying, by model checking, a network controlled by a network control technique known as OpenFlow.

While having features as described above, the model checking includes a problem that memories and time necessary for calculation increase exponentially for a scale of a verification object. Therefore, in model checking intended to verify a practical system and software, it is necessary to execute searches efficiently.

NPL 2, for example, discloses a technique referred to as DPOR (Dynamic Partial Order Reduction). The DPOR is a technique for pruning a redundant search from the viewpoint of verification, in model checking for a multithread environment model. The DPOR first executes one arbitrary path when searching a state transition system as an object of model checking. The path is referred to as an execution path. The DPOR confirms whether a combination of transitions of which execution orders affect an execution result, is included in a transition series configuring the execution path. Such a combination of transitions is referred to as transitions having a dependence relation. When there are transitions with a dependence relation, the DPOR generates a backtrack point to search a path in which execution orders of the combination are switched. The backtrack point is generated in a state immediately before a transition previously made among the combination on the execution path. A search from the backtrack point is started from a point of making a transition (a transition different from the transition previously made among the combination) different from an execution path from the state to the last time. After detecting all the transitions with a dependence relation from the execution path and finishing generating a backtrack point in a state immediately before a transition previously made among the detected transitions, the DPOR re-starts a search from a last backtrack point in the execution path. This procedure is repeated until all backtrack points are searched.

Thereby, the DPOR is able to search only paths whose execution results are different, among all the execution patterns to be checked. In other words, the DPOR is able to execute searches efficiently, by pruning searches paths whose verification results are not different, for example, NPL 3 discloses DPOR-DS (Dynamic Partial Order Reduction in Distributed Systems). The DPOR-DS is a technique that extends DPOR for model checking of a distributed environment model. In the DPOR-DS, to absorb a difference between environments relating to a model to be checked, a method for generating a backtrack point is changed. The DPOR-DS defines a happens-before relation in a distributed environment model with respect to a relation between transitions on an execution path, in addition to a dependence relation. The DPOR-DS applies the defined relation to determine generation of a backtrack point.

The happens-before relation is a relation regarding an execution order between transitions that is always satisfied in a certain model. For example, assuming transitions that transmit/receive a certain packet "p". In this case, a transition that transmits the packet "p" happens always before a transition that receives the packet "p". In this manner, a relation regarding an order between transitions always satisfied on the basis of a causal relation in a model is referred to as a happens-before relation.

In the DPOR-DS, in addition to a dependence relation, the presence or absence of a happens-before relation with regard to transitions on an execution path is also analyzed. A backtrack point is not generated by the DPOR-DS, when a happens-before relation is satisfied, even when there is a dependence relation between two transitions.

Further, in the DPOR-DS, when re-starting a search from a backtrack point, a happens-before relation for a combination of two transitions having a dependence relation is also considered. In the combination of two transitions having a dependence relation, assuming a case that a transition made former is designated as $t_1$ and a transition made later is designated as $t_2$. In this case, the DPOR-DS first continuously executes, in a search to be re-started, the transition $t_2$ and a transition having a happens-before relation with the transition $t_2$ among transitions made between the transitions $t_1$ and $t_2$.

FIG. 15 illustrates a specific example of re-starting a search from a backtrack point in the DPOR-DS. In FIG. 15, a circle represents a state of a model and an arrow represents a transition. It is assumed that in a first search, transitions are made in order of "$t_a$", "$t_b$", "$t_c$", and "$t_d$". In addition, it is also assumed that, by analysis of a dependence relation, "$t_a$" and "$t_d$" have been determined to have a dependence relation. Further, it is assumed that by analysis of a happens-before relation, "$t_c$" and "$t_d$" have been determined to have a happens-before relation. In other words, the transition "$t_c$" is always made before "$t_d$".

The DPOR-DS generates a backtrack point "$b_1$" in a state "$s_0$" that is a state immediately before making "$t_a$". The DPOR-DS first makes, when re-starting a search from the backtrack point "$b_1$", transitions of "$t_c$" and "$t_d$". In other words, "$t_c$" is a transition having the happens-before relation with the transition ("$t_d$"), which is made later in the combination having the dependence relation between transitions ("$t_b$" and "$t_c$"), among the combination of two transitions ("$t_a$" and "$t_d$") having the dependence relation. Further, "$t_d$" is a transition made later in the combination of two transitions having the dependence relation. In a re-search, an order of transitions thereafter is not determined, and an arbitrary path is searched and executed. In other words, in this example, for example, from the backtrack point "$b_1$", transitions are made in order of "$t_c$", "$t_d$", "$t_a$", and "$t_b$". Among these transitions, first "$t_c$" and "$t_d$" are a portion for which an order of executions is defined by a search algorism of the DPOR-DS, as described above. The remaining "$t_a$" and "$t_b$" are a portion for which an order of executions is arbitrarily determined. The definition of the order for the first portion is contrivance to reduce redundant searches.

FIG. 16 illustrates a case without that contrivance, as a specific example. Assuming a case in which only one transition (only "$t_c$") being made first on re-starting a search in backtracking is specified, in the above-described example. In this case, it may be possible to make transitions in order of "$t_c$", "$t_a$", "$t_b$", and "$t_d$" from the backtrack point "$b_1$". Intention of the re-start of the search from the backtrack point "$b_1$" was to execute the search by switching orders of "$t_a$" and "$t_d$" having the dependence relation, however in this search (a second search), these orders are not changed. In this case, a dependence relation is analyzed again for a path of "$t_c$", "$t_a$", "$t_b$", and "$t_d$". In a state "$s_5$" which is a state immediately before making "$t_a$", a backtrack point "$b_2$" is generated. Thereby, in a next search from the backtrack point "$b_2$", is may be possible to execute a search (a third search) of a path causing transitions in a desired order of "$t_c$", "$t_d$", "$t_a$", and "$t_b$".

However, in this case, the second search (a search of a path of "$t_c$", "$t_a$", "$t_b$", and "$t_d$") is redundant from the viewpoint of verification and is needless from the viewpoint of efficiency. To reduce this redundant search, the DPOR-DS provides contrivance to specify a first transition sequence on re-starting a search by backtracking and to reduce a search of a redundant path. The specified first transition sequence includes "$t_c$" and "$t_d$" in the above-described example. The reduced redundant path includes "$t_c$", "$t_a$", "$t_b$", and "$t_d$" in the above-described example. The DPOR-DS is able to prune, using these procedures, searches in model checking of a distributed environment model.

In addition, above-described NPL 1 describes a case which includes a transition with use of data (packets) when a state search is executed using model checking for a network controlled by OpenFlow. In other words, in such a transition, this related technique in NPL 1 executes symbolic execution for a program of an OpenFlow controller and thereby determines a set of representative values of packets capable of causing all transitions. The related technique searches a state using the determined data set. Such a data set is a set of packets such that when the OpenFlow controller program is executed using respective packets that are elements of the data set supplied as inputs, transitions based on all the operation patterns of the program can be made, as a result.

As described above, mainly in a test or a technique referred to as model checking, a method for determining a set of data to be used on the basis of symbolic execution of a program (or another technique for dividing data range) is referred to as a concolic technique. Further, handling data by the concolic technique is expressed as "handling data in a concolic manner." Hereinafter, processing for determining a set of data to be used by the concolic technique will be also referred to as "concolic processing."

CITATION LIST

Non Patent Literature

NPL 1: Canini, M. et al.: "A NICE Way to Test OpenFlow Applications", Proc. of NSDI, 2012.

NPL 2: Flanagan, C. et al.: "Dynamic partial-order reduction for model checking software", Proc. of POPL '05, pp. 110-121, 2005.

NPL 3: Yabandeh, M. et al.: "DPOR-DS: Dynamic Partial Order Reduction in Distributed Systems", EPFL Technical Report NSL-REPORT-2009-005, 2009.

SUMMARY OF INVENTION

Technical Problem

Assuming a case in which redundant searches are pruned by applying DPOR or DPOR-DS described in NPL 2 or 3 to model checking which handles data in a concolic manner as described in NPL 1. In this case, when these related techniques are simply combined, as described later, needless searches occur. That is, in this case, there has been a problem that the above-described related techniques and a combination thereof cause redundant searches from the viewpoint of verification, and therefore causes inefficient search.

This problem will be described using a specific example. First, FIG. 17 illustrates a configuration of an OpenFlow network as a specific example of a verification object. In FIG. 17, a controller learns a MAC (Media Access Control) address. It is assumed that a switch and the controller have already learned MAC addresses of a terminal 1 and a terminal 2. In this case, it is assumed that a terminal 3 and a terminal 4 mutually transmit a packet once.

First, in a first search "A", it is assumed that the following transitions have been made.

1) The terminal 3 transmits a "packet 1".
2) The switch receives the "packet 1" and transmits a "packet_in1" to the controller.
3) The controller receives the "packet_in1" and transmits a "flow_mod1" and a "packet_out1" to the switch.
4) The switch receives the "flow_mod1" and the "packet_out1", installs a flow entry, and transfers the "packet 1" to the terminal 4.
5) The terminal 4 transmits a "packet 2".
6) The switch receives the "packet 2" and transmits a "packet_in2" to the controller.
7) The controller receives the "packet_in2" and transmits a "flow_mod2" and a "packet_out2" to the switch.
8) The switch receives the "flow_mod2" and the "packet_out 2", installs a flow entry, and transfers the "packet 2" to the terminal 3.

In the description of the above-described transitions, a "packet_in" is a message for inquiring of the controller about a processing method when the switch does not store a transfer rule (flow entry) matching a received packet. A "flow_mod" is a message for instructing the switch to add/correct the flow entry. A "packet_out" is a message for instructing the switch to transfer a packet. Further, a number following the "packet_in," the "flow_mode," or the "packet_out" represents that messages of the same type having the same number indicate the same content.

Further, in the above-described search "A", a content of a packet is handled in a concolic manner. Specifically, the transition 1 and the transition 5 in the search "A" transmit a packet. Before the each of transition 1 and the transition 5 is made, symbolic execution for a program of the controller is executed, and thereby a set of representative values of packets enables to enumerate operation patterns of the program is determined (concolic processing). In these transitions, any one of the packets in the determined set is transmitted.

First, in concolic processing before the transition 1, a set of packets of the following types is determined.

A packet of which destination MAC address is a MAC address of the terminal 1, A packet of which destination MAC address is a MAC address of the terminal 2, Another packet.

The reason is that in a state before the transition 1, the switch and the controller have already learned the MAC addresses of the terminal 1 and the terminal 2.

In concolic processing before the transition 5, a set of packets of the following types is determined.

A packet of which destination MAC address is the MAC address of the terminal 1, A packet of which destination MAC address is the MAC address of the terminal 2, A packet of which destination MAC address is a MAC address of the terminal 3, Another packet The reason is that in a state before the transition 5, the transitions 3 and 4 have been made, and therefore the switch and the controller have already learned the MAC address of the terminal 3, in addition to the terminal 1 and the terminal 2.

As to the search "A", in each of the transition 1 and the transition 5, "another packet" is selected according to the result of the concolic processing. In actual processing, in addition to the search A, a search in accordance with a combination of the types of the packets is executed individually. For convenience of explanation, description thereof will be omitted.

Next, a dependence relation in the path executed in the search A is analyzed. As a result, before and after a flow entry is installed by the transition 8, a result of concolic processing before the transition 1 is changed. In other words, the transition 1 and the transition 8 have a dependence relation. Therefore, in a next search, backtracking is executed to a point before the transition 1 (in this case, a first place), and a path where the transition 8 is made before the transition 1 is re-searched.

In the following re-search "B", it is assumed that the following transitions have been made.
1) The terminal 4 transmits a "packet 2" (the transition 5 in the search "A").
2) The switch receives the "packet 2" and transmits a "packet_in2" to the controller (transition 6 of the search "A").
3) The controller receives the "packet_in2" and transmits a "flow_mod2" and a "packet_out2" to the switch (the transition 7 of the search "A").
4) The switch receives the "flow_mod2" and the "packet_out2", installs a flow entry, and transfers the "packet 2" to the terminal 3 (the transition 8 of the search "A").
5) The terminal 3 transmits a "packet 1" (the transition 1 of the search "A").
6) The switch receives the "packet 1" and transmits a "packet_in1" to the controller (the transition 2 of the search "A").
7) The controller receives the "packet_in1" and transmits a "flow_mod1" and a packet_out1 to the switch (the transition 3 of the search "A").
8) The switch receives the "flow_mod1" and the "packet_out1", installs a flow entry, and transfers the "packet 1" to the terminal 4 (the transition 4 of the search "A").

In such a search "B", in concolic processing before the transition 1 (the transition 5 of the search "A"), a set of packets of the flowing types is determined.

A packet of which destination MAC address is a MAC address of the terminal 1, A packet of which destination MAC address is a MAC address of the terminal 2, Another packet.

The reason is that in a state before the transition 1 (the transition 5 of the search "A"), the switch and the controller have already learned the MAC addresses of the terminal 1 and the terminal 2.

Further, in concolic processing before the transition 5 (the transition 1 of the search "A"), a set of packets of the following types is determined.

A packet of which destination MAC address is the MAC address of the terminal 1, A packet of which destination MAC address is the MAC address of the terminal 2, A packet of which destination MAC address is a MAC address of the terminal 4, Another packet.

The reason is that in a state before the transition 5 (the transition 1 of the search "A"), the transitions 3 and 4 (the transitions 7 and 8 of the search "A") have been made, and therefore the switch and the controller have already learned the MAC address of the terminal 4, in addition to the terminal 1 and the terminal 2.

Also in the case of the search "B", in the same manner as in the search "A", in concolic processing of any transition, "another packet" is selected. In the same manner as the search "A", in actual processing, in addition to the search "B", a search in accordance with a combination of the types of the packets is executed individually. However for convenience of explanation, description thereof will be omitted.

As described above, a result of concolic processing before the transition 5 of the search "B" (the transition 1 in the search "A") is different from a result of concolic processing before the transition 1 of the search "A". As described above, DPOR (or DPOR-DS that is an extended technique thereof) may also be applicable in model checking which handles data in a concolic manner, when analyzing a dependence relation in consideration of transitions in which results of concolic processing are changed.

On the other hand, there are many needless searches when executing model checking for a network controlled by a network control technique such as, specifically, OpenFlow, by use of combinations of above NPL 1 and above NPL 2 and 3. The reason is described below.

FIG. 18 is a diagram schematically illustrating state transitions being searched. In FIG. 18, a transition number is arranged above an arrow representing a transition. In this case, the transition number indicates the transition number in the above-described search "A", for convenience of description. In a right side of each execution path, type of packet being transmitted in the transition 1 in each search, is described.

In FIG. 18, searches "A'" and "A''" are paths where "a packet of which destination is a MAC address of the terminal 1" and "a packet of which destination is a MAC address of the terminal 2" are selected, respectively, from a result of concolic processing in the transition 1 in the same order of transitions as in the search "A". Searches "B", "B'", "B''", and "B'''" are paths in which orders of the transition 1 and the transition 8 are switched from the search "A", and from the result of the concolic processing in the transition 1, respective packets are selected. Among re-searches "B", "B'", "B''", and "B'''" in which the transition 8 is made before the transition 1, a portion surrounded by a dashed line in FIG. 18 indicates needless searches. In other words, in the portion surrounded by the dashed line, orders of transitions are different. However, from the viewpoint of verification, these searches are equivalent to a search in which the transition 1 is made before the transition 8. Here, the reason of switching orders of the transition 1 and the transition 8 is that there is a dependence relation in which a result of concolic processing executed before the transition 1 is changed, when the orders of the transition 1 and the transition 8 are switched.

On the other hand, even when the transition 1 and the transition 8 are switched, anything other than a result of concolic processing executed before the transition 1 is not changed. The dependence relation between the transition 1 and the transition 8 was generated, specifically, in model checking that handles data in a concolic manner. In other words, in general model checking that does not handle data in a concolic manner, there is no dependence relation between the transition 1 and the transition 8. Therefore, in the re-searches "B", "B'", "B''", and "B''''", a search of a path, in which a packet of the same type as in the transition 1 before switching the orders of the transition 1 and the transition 8 is transmitted, is equivalent from the viewpoint of verification, while orders of transitions are merely switched. Therefore, a second and following searches of an execution path are needless. Specifically, searches regarding "B'", "B''', and "B''''" in which the packet of the same type of the packet transmitted in the transition 1 in the "A'", "A'", and "A''''" is transmitted are needless.

As described above, in model checking with handling data in a concolic manner described in NPL 1, even when DPOR described in NPL 2 or 3 is applied, needless searches are executed. In other words, in model checking that executes searches while determining a data set used in transitions of a state transition model, there has been a problem that it is difficult to sufficiently reduce occurrence of needless searches, when applying only an existing technique for pruning redundant searches.

The present invention has been made to solve the problem. In other words, an object of the present invention is to provide a technique for more sufficiently reducing redundant searches in model checking for executing searches while determining a data set used in transitions of a state transition model.

Solution to Problem

To achieve the objective, a model checking apparatus according to the present invention is configured to include processing circuitry that is configured to function as: a verification information acceptance unit that is configured to accept verification information representing a state transition model and a verification content for the state transition model; a model search unit that is configured to obtain an execution path by causing a transition in the state transition model; a data set determination processing unit that is configured to execute data set determination processing for determining a data set, the data set being a set of representative values of data used in a transition with data use in the state transition model; a re-search control unit that is configured to control the model search unit to use a data set in which data already used in a previous search in the transition with data use is excluded from the data set obtained by the data set determination processing in the transition with data use, when performing a re-search from a backtrack point based on a dependence relation relating to the data set determination processing between transitions on the execution path; and an output device that is configured to function as a verification result output unit in accordance with control by the processing circuitry, the verification result output unit being configured to provide a verification result of the verification content based on a search result of the model search unit according to the control of the re-search control unit.

A model checking method according to the present invention includes: by a computer, accepting verification information representing a state transition model and a verification content for the state transition model; obtaining an execution path by causing a transition in the state transition model; analyzing, between transitions on the execution path, a dependence relation relating to data set determination processing for determining a data set, the data set being a set of representative values of data used in a transition with data use; performing a re-search using a data set in which data already used in a previous search in the transition is excluded from the data set obtained by the data set determination processing in the transition with data use, when performing a re-search from a backtrack point based on the dependence relation relating to the data set determination processing; and providing a verification result of the verification content based on the search result.

A storage medium according to the present invention stores, a model checking program that causes a computer apparatus to execute: a verification information accepting processing for accepting verification information representing a state transition model and a verification content for the state transition model; a model search processing for obtaining an execution path by causing a transition in the state transition model; a dependence relation analysis processing for analyzing, between transitions on the execution path, a dependence relation relating to data set determination processing for determining a data set, the dataset being a set of representative values of data used in a transition with data use; a re-search control processing for performing a re-search using a data set in which data already used in a previous search in the transition is excluded from the data set obtained by the data set determination processing in the transition with data use, when performing a re-search from a backtrack point based on the dependence relation relating to the data set determination processing; and a verification result output processing for providing a verification result of the verification content based on the search result.

Advantageous Effects of Invention

The present invention can provide a technique for more sufficiently reducing redundant searches in model checking for executing searches while determining a data set used in transitions of a state transition model.

DESCRIPTION OF EMBODIMENTS

Hereinafter, example embodiments of the present invention will be described in detail with reference to the accompanying drawings.

(First Example Embodiment)

Figure 1:
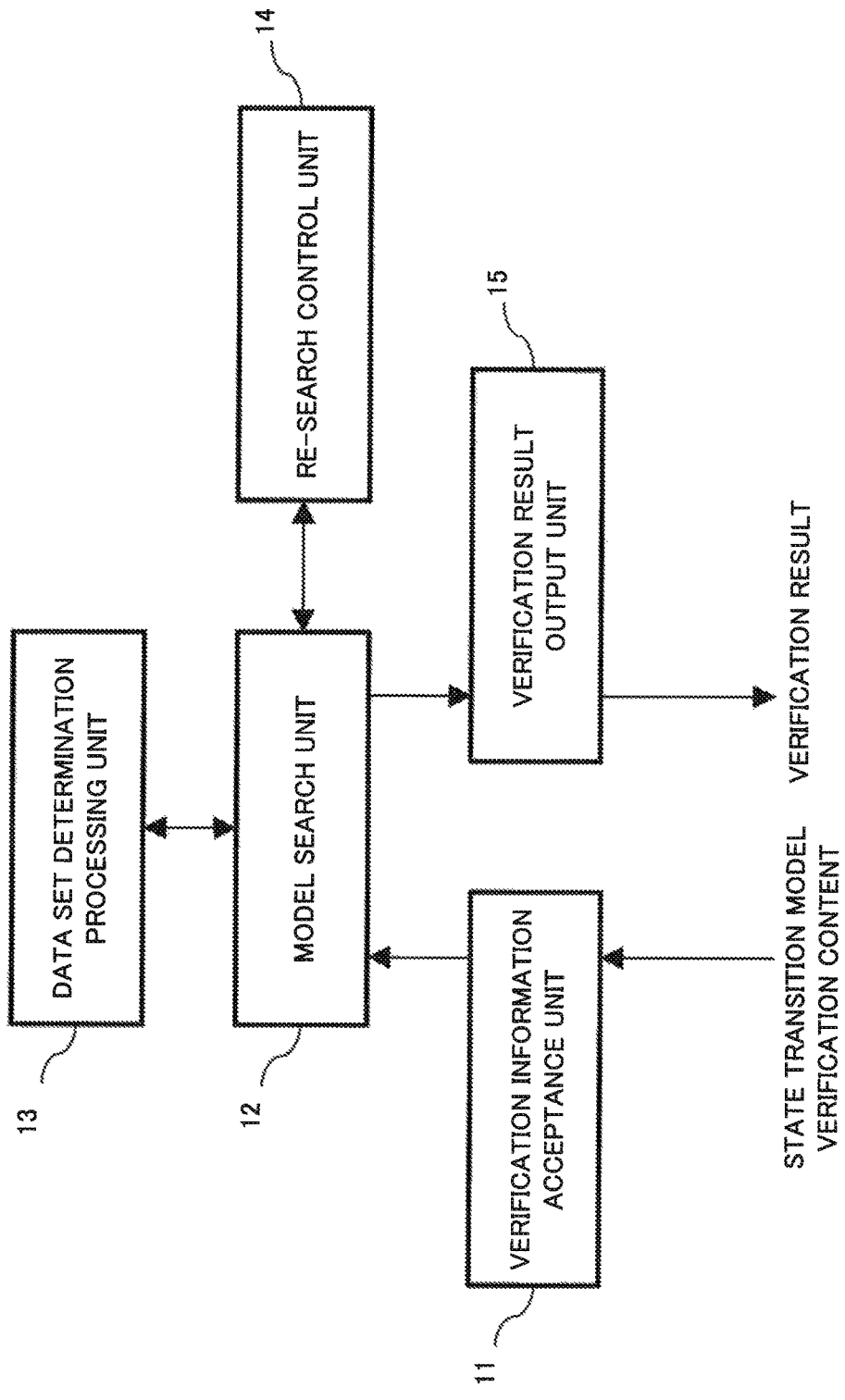
FIG. 1 is a diagram illustrating a configuration of functional block of a model checking apparatus as a first example embodiment of the present invention.

A configuration of functional block of a model checking apparatus 1 as a first example embodiment of the present invention is illustrated in FIG. 1. In FIG. 1, the model checking apparatus 1 includes a verification information acceptance unit 11, a model search unit 12, a data set determination processing unit 13, a re-search control unit 14, and a verification result output unit 15. In FIG. 1, a direction of an arrow connecting rectangles representing function blocks indicates one example and does not limit a direction of a signal between the function blocks.

Figure 2:
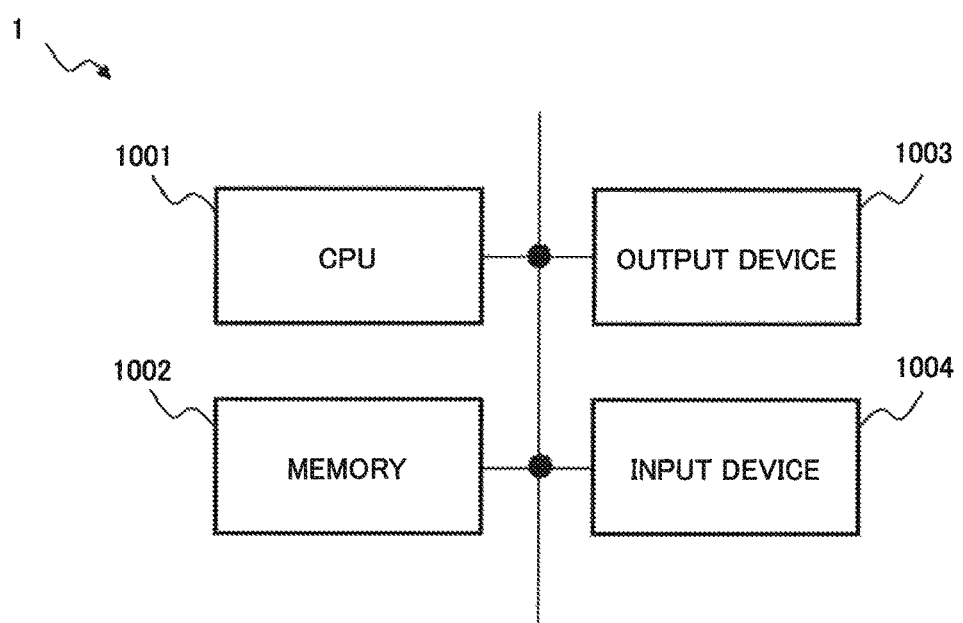
FIG. 2 is a diagram illustrating one example of a hardware configuration of the model checking apparatus as the first example embodiment of the present invention.

The model checking apparatus 1 may be realized by hardware elements as illustrated in FIG. 2. In FIG. 2, the model checking apparatus 1 includes a CPU (Central Processing Unit) 1001, a memory 1002, an output device 1003, and an input device 1004. The memory 1002 includes a RAM (Random Access Memory), a ROM (Read Only Memory), an auxiliary storage apparatus (a hard disk or the like), or the like. The output device 1003 includes an apparatus such as a display apparatus, a printer, and the like that outputs information. The input device 1004 includes an apparatus such as a keyboard, a mouse, and the like that receives input of a user operation.

In this case, each function block of the model checking apparatus 1 is realized by the CPU 1001 that reads and executes a computer program stored on the memory 1002 and controls the output device 1003 and the input device 1004. The model checking apparatus 1 and a hardware configuration of each function block thereof are not limited to the above-described configurations.

Next, each function block of the model checking apparatus 1 will be described.

The verification information acceptance unit 11 accepts verification information. The verification information includes a state transition model and information indicating a verification content the state transition model. The verification information may include a property which indicates, for example, whether the verification content is satisfied by the state transition model. The verification information acceptance unit 11 may accept, as verification information, for example, information stored on the memory 1002 in advance. The model search unit 12 may also accept, as verification information, information input via the input device 1004, a portable storage medium, or the like.

The model search unit 12 causes a transition in a state transition model to make a transition and thereby obtains an execution path. The model search unit 12 causes a state transition model to make a transition and thereby checks a verification content. The model search unit 12 may determine, for example, whether a state satisfies the verification content for each time causing the transition in the state transition model. Further, the model search unit 12 may terminate a search when determining that the verification content is not satisfied. The model search unit 12 selects any one piece of data from a data set determined by the data set determination processing unit 13 to be described below and executes a transition, when executing a transition with data use.

The data set determination processing unit 13 determines a set of representative values of data to be used in a transition with data use in a state transition model. Hereinafter, such a set of representative values of data will be also described simply as a "data set." Such a set of representative values is a set of elements each of which enables all operation patterns relating to a transition, when the element is supplied as input to execute the transition.

The re-search control unit 14 executes a re-search from a backtrack point on the basis of a dependence relation relating to data set determination processing between transitions on an execution path. The re-search control unit 14 uses a difference from a data set determination processing result in a transition involving data use in a re-search. The difference from a data set processing result represents a data set including data obtained by excluding data already used in a previous search in the transition from a data set obtained by data set determination processing.

Transitions having a dependence relation relating to data set determination processing means a relation in which when orders of the transitions are switched, a result of data set determination processing in at least one of the transitions is changed. The re-search control unit 14 may determine that there is the dependence relation relating to data set determination processing, for example, in a combination of the following transitions on an execution path. The combination of such transitions may be, for example, combination where one transition uses data based on a result of data set determination processing and the other transition affects the result of the data set determination processing.

In such a case, when orders of transitions having the dependence relation relating to data set determination processing are temporarily switched and the re-search is executed, a result of data set determination processing used in one of the transitions becomes different from a case where the orders are not switched. In this case, the re-search control unit 14 may determine, as the backtrack point, a state immediately before a transition using data based on a result of data set determination processing among transitions having the dependence relation relating to data set determination processing on an execution path.

The re-search control unit 14 uses the following information as a data set used in a transition with data use in a re-search from a backtrack point. That is, the re-search control unit 14 uses a difference from a data set processing result in which orders of transitions having the dependence relation relating to data set determination processing are temporarily switched. Specifically, the re-search control unit 14 considers that a data set determined by data set determination processing when temporarily switching orders includes data already used in a corresponding transition in a previous search. The re-search control unit 14 determines, in a transition with data use in a re-search, a data set which is obtained by excluding data already used in a previous search from the data set obtained by the data set determination processing where the above-described orders are temporarily switched. The re-search control unit 14 may use the data set to execute the re-search. The re-search control unit 14 may execute such processing for obtaining the difference from a data set processing result, when analyzing the dependence relation relating to data set determination processing and determining the backtrack point.

The verification result output unit 15 provides a verification result of a verification content obtained by the model search unit 12 to the output device 1003 or the like. The verification result output unit 15 may provide, for example, whether the verification content is determined to be satisfied as a result a search executed by the model search unit 12. The verification result output unit 15 may also provide, when the verification content is not satisfied, a counter example in which the verification content is not satisfied.

An operation of the model checking apparatus 1 configured as described above will be described with reference to FIG. 3.

Figure 3:
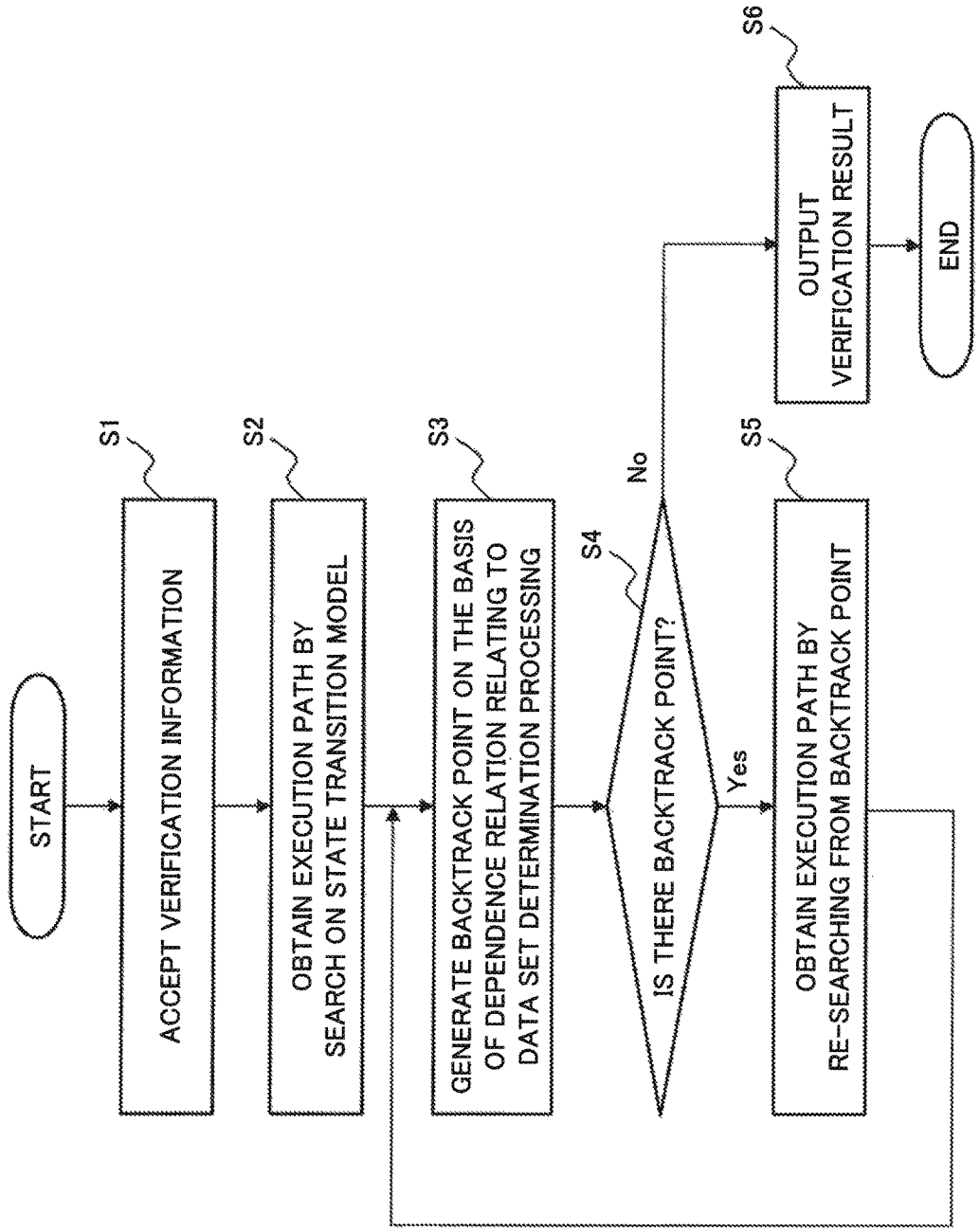
FIG. 3 is a flowchart illustrating an operation of the model checking apparatus as the first example embodiment of the present invention.

In FIG. 3, first, the verification information acceptance unit 11 accepts verification information (step S1).

The model search unit 12 causes a state transition model included in the verification information to make a transition and obtains any execution path (step S2).

As described above, the model search unit 12 executes a transition by selecting one element from a data set determined by the data set determination processing unit 13 when executing a transition with data use. Further, as described above, the model search unit 12 verifies a verification content while executing transitions.

The re-search control unit 14 analyzes a dependence relation relating to data set determination processing between transitions on the execution path obtained in step S2. The re-search control unit 14 generates a backtrack point on the basis of the analysis result (step S3).

The model search unit 12 executes, when there are backtrack points on the execution path (Yes in step S4), a re-search from the deepest (last) backtrack point. The model search unit 12 obtains an execution path by the re-search (step S5). As described above, the re-search control unit 14 controls the model search unit 12 to use a difference from a data set processing result in the transition with data use in the re-search.

The operation of the model checking apparatus 1 repeats steps S3 to S5 for the execution path obtained by the re-search. In other words, the re-search control unit 14 generates backtrack points on the basis of the dependence relation relating to data set determination processing between transitions on the execution path obtained by the re-search. The re-search control unit 14 executes the re-search from the deepest backtrack point.

When there is no backtrack point for which the re-search is not executed on the execution path (No in step S4), the verification result output unit 15 provides a verification result (step S6). The model checking apparatus 1 terminates the operation.

Next, advantageous effects of the first example embodiment of the present invention will be described.

The model checking apparatus according to the first example embodiment of the present invention can more sufficiently reduce redundant searches in model checking for executing searches while determining a data set used in transitions of a state transition model.

The reason is described below. In the present example embodiment, a model search unit executes a search using a set (data set) of representative values of data determined by the data set determination processing unit on the transition with data use when obtaining an execution path by causing a transition in the state transition model. The re-search control unit determines the backtrack point on the basis of the dependence relation relating to data set determination processing between transitions on an execution path and controls the re-search from the backtrack point. In other words, the re-search control unit controls the model search unit to use the difference from the data set processing result in the transition with data use in the re-search. The difference from the data set processing result represents a data set in which from a data set determined by data set determination processing in a transition with data use in a re-search, data already used in a previous search in the transition is excluded.

In this manner, the first example embodiment of the present invention uses the above-described difference from a data set processing result when the transition with data use is made in the re-search by backtracking, in model checking with searching while determining a data set used in transitions of the state transition model. Therefore, the present example embodiment does not need to execute needless searches using data equivalent to past searches from the viewpoint of verification.

In details, in the present example embodiment, the re-search control unit determines that there is the dependence relation relating to data set determination processing in a combination of transitions on an execution path in the following case. That is, a case such that one of the combination is a transition using data based on a result of data set determination processing and the other of the combination is a transition that affects the result of the data set determination processing, corresponds to that case. In the present example embodiment, the re-search control unit generates the backtrack point immediately before a transition using data based on a result of data set determination processing, among a combination of transitions having such a dependence relation. The re-search control unit controls, in a transition with data use in the re-search, the model search unit to execute the re-search, by use of the difference from the data set processing result in which orders of transitions having the dependence relation are temporarily switched, without actually switching the orders of the transitions. In other words, the difference from the data set processing result is a data set in which data already used in a previous search is excluded from a data set determined by data set determination processing, when orders of transitions having the dependence relation relating to data set determination processing are temporarily switched.

In the combination of transitions having the dependence relation relating to data set determination processing, when orders of the transitions are switched, a result of data set determination processing is changed. However other results are not changed. In other words, even temporarily switching the orders, with regard to a transition with data use based on data set determination processing, only data sets to be used in the transition are different and there are no differences for other results, whether the transition is executed before or after a transition that affects a result of data set determination processing. Therefore, it is meaningless to execute such a search by switching orders of transitions, from the viewpoint of verification.

As described above, the present example embodiment executes search processing efficiently while reducing needless searches, by use of a difference from a data set determination processing result in which the orders are temporarily switched, while actually does not switch orders of transitions.

(Second Example Embodiment)

Next, a second example embodiment of the present invention will be described in detail with reference to corresponding drawings. In each drawing to be referred to in description of the present example embodiment, the same component as in the first example embodiment of the present invention and a step operating in the same manner are assigned with the same reference signs, respectively, and therefore detailed description in the present example embodiment will be omitted. In the present example embodiment, an example of applying a network model representing a network controlled by a network control technique as a verification object of the model checking apparatus of the present invention, will be described. In the present example embodiment, as the network control technique, for example, OpenFlow is assumed. However, a technique for controlling a network represented by a state transition model to be checked by the present example embodiment is not limited to OpenFlow.

[Description of Configuration]

Figure 4:
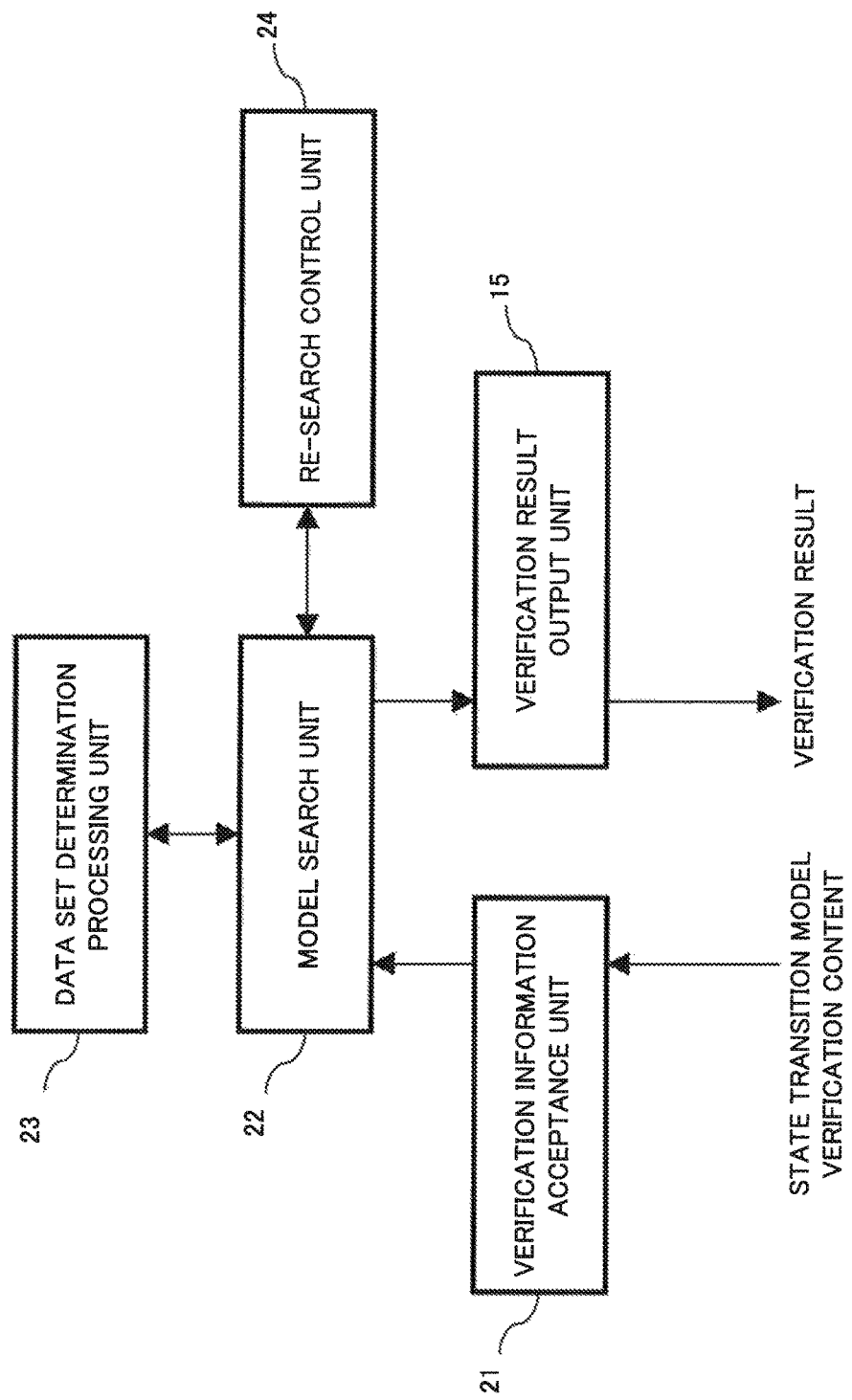
FIG. 4 is a diagram illustrating a configuration of functional block of a model checking apparatus as a second example embodiment of the present invention.

First, a configuration of a model checking apparatus 2 as the second example embodiment of the present invention is illustrated in FIG. 4. In FIG. 4, the configuration of the model checking apparatus 2 is different from that of the model checking apparatus 1 as the first example embodiment of the present invention in the following points. The model checking apparatus 2 includes a verification information acceptance unit 21 instead of the verification information acceptance unit 11, a model search unit 22 instead of the model search unit 12, a data set determination processing unit 23 instead of the data set determination processing unit 13, and a re-search control unit 24 instead of the re-search control unit 14. In FIG. 4, a direction of an arrow connecting rectangles representing functional blocks indicates one example and does not limit a direction of a signal between the functional blocks.

The model checking apparatus 2 and respective functional blocks may be realized by the same hardware elements as in the first example embodiment of the present invention with reference to FIG. 2. Hardware configurations of the model checking apparatus 2 and the functional blocks are not limited to the above-described configuration.

In the present example embodiment, specifications of a network model will be described as ones described below.

First, a definition of a state of the network model will be described. The state is defined as a six-piece set of ("T", "S", "C", "P", "M", "Q"). "T" represents a set of terminals. An element "t" ("t"∈"T") of "T" has a variable "sv" indicating a state thereof. "S" represents a set of switches. An element "s" ("s"∈"S") of "S" has a variable "E" indicating a set of flow entries. The flow entry is a transfer rule installed on a switch. Further, an element "e" ("e"∈"E") of "E" represents a flow entry and is defined as a set of ("mr", "af"). The term "mr" represents a content of a matching rule.

The term "af" represents a content of an action field. "C" represents a set of controllers. An element "c" ("c"∈"C") of "C" has a variable "V" indicating a set of variables globally handled by respective operation models of a controller "c". An element "v" ("v"∈"V") of "V" is one variable globally handled by an operation model of the controller. The element "v" is defined as a set of ("vn", "vv"). The term "vn" represents a name of a variable. The term "vv" represents a content of the variable. "P" represents a set of packets. An element "p" ("p"∈"P") of "P" has a variable "pv" indicating a content of a packet. "M" represents a set of control messages. When, for example, the network model represents an OpenFlow network, the control message is an OpenFlow message. An element m (m∈M) of the control message "M" has a variable "mv" indicating a content of the control message. "Q" represents a set of communication ports. An element "q" ("q"∈"Q") of "Q" is a communication port realized by a FIFO (First In, First Out) queue storing a packet and a control message.

A network to be checked includes respective apparatuses of a terminal, a switch, and a controller. Each apparatus includes a communication port for communicating with another apparatus (the terminal, the switch, or the controller). A communication port is provided for each of transmission and reception respectively, between mutually communicable apparatuses. That is, a transmission communication port for a certain terminal, switch, or controller is a reception communication port for another terminal, switch, or controller. Further, the reception communication port for a certain terminal, switch, or controller is the transmission communication port for another terminal, switch, or controller. Hereinafter, communication ports for transmitting/receiving a packet will be described also as a packet transmission communication port and a packet reception communication port. Hereinafter, communication ports for transmitting and receiving a control message will be described as a control message transmission communication port and a control message reception communication port. Further, the terminal, the switch, and the controller may be collectively referred to as a node.

In the following, a definition of a transition in a network model will be described. The transition represents a situation where any one of a terminal, a switch, and a controller included in a network represented by the network model executes an specific unit of operation and thereby a state of the model is changed. The specific unit of operation may include, for example, the following six types.

1: Packet transmission of a terminal,
2: Packet reception of a terminal,
3: Flow entry application of a switch,
4: Inquiry message transmission of a switch,
5: Control message reception of a switch,
6: Program execution of a controller.

Operations of the six types will be described in detail.

First, a packet transmission operation of a terminal will be described. The terminal can execute a packet transmission operation in accordance with an own state "sv". In the packet transmission operation of the terminal, a terminal "t" generates one packet "p" and stores the packet "p" on the transmission communication port of the terminal "t" (i.e. the reception communication port of a certain switch "s"). By this operation, a content of the state "sv" of the terminal t is changed (in some cases, the state may not be changed).

Next, a packet reception operation of a terminal will be described. The terminal can execute a packet reception operation, when one or more packets are stored on the packet reception communication port of the own. In the packet reception operation of the terminal, a terminal "t" picks up a first stored packet "p" from the packet reception communication port "q" storing one or more packets. By this operation, in accordance with a content "pv" of the packet "p", a content of a state "sv" of the terminal "t" is changed (in some cases, the state may not be changed).

Next, a flow entry application of a switch will be described. The switch can execute a flow entry application operation, when one or more packets are stored on the packet reception communication port of the own and when the switch includes a flow entry applicable to a packet first stored on the packet reception communication port. In the flow entry application operation of the switch, the switch s first picks up the first stored packet "p" from the packet reception communication port "q" storing one or more packets. The switch "s" compares a matching rule "mr" of each flow entry included in the switch "s" and a content "pv" of the packet "p". The switch selects one flow entry "e" applicable to the packet "p". Finally, the switch "s" executes an operation in accordance with an action field "af" of the selected flow entry "e".

Next, an inquiry message transmission operation of a switch will be described. An inquiry message is one of control messages. When, for example, the network model represents an OpenFlow network, the inquiry massage is a "packet_in" message. The switch may execute the inquiry message transmission operation, when the switch stores one or more packets on the packet reception communication port of the own and the switch includes no flow entry applicable to the packet first stored on the packet reception communication port. In the inquiry message transmission operation of the switch, a switch "s" first picks up the first stored packet "p" from the packet reception communication port "q1" storing one or more packets. The switch "s" stores an inquiry message "m" including information of the packet "p" on the control message transmission communication port "q2" between the switch and a controller.

Next, a control message reception operation of a switch will be described. The switch may execute the control message reception operation, when the switch stores one or more control messages on the control message reception communication port of the own. In the control message reception operation of the switch, the switch "s" first picks up a first stored control message "m" from the control message reception communication port "q" storing one or more control messages. The switch "s" executes an operation in accordance with a content "mv" of the control message "m" being picked up.

Next, a program execution operation of a controller will be described. The controller may execute a program execution operation, when the controller stores one or more control messages on the control message reception communication port of the own. In the program execution operation of the controller, a controller "c" first picks up the first stored control message "m" from the control message reception communication port "q" storing one or more control messages. The controller "c" executes an operation corresponding to a content "mv" of the control message "m" being picked-up, among operations of the controller defined in the network model. When the operation corresponding to "mv" is not defined, the controller "c" may execute a default operation specified by specifications of the network control technique.

The verification information acceptance unit 21 is configured in the same manner as in the first example embodiment of the present invention. However, the verification information acceptance unit 21 differs in a point, that the verification information acceptance unit 21 accepts, as verification information to be checked, information indicating a network model and a verification content for the model as described above. The network model is not limited to the above-described definition, and may include model of a state transition system conforming to specifications of various types of known network control techniques. The verification information may include a verification property for a network model. The verification property may include, for example, an item representing that "a packet transfer loop is not generated" or an item representing that "a packet loss does not occur." The verification information may not necessarily include a verification property. When the verification information does not include a verification property, the verification information acceptance unit 21 may verify a typical verification property for the network model.

The model search unit 22 causes a transition of state of a network model included in verification information, according to an operation of each node as described above, and thereby obtains an execution path. The model search unit 22 determines a success or failure of a verification property in a state after the transition, when causing the transition of the state of the network model. The model search unit 22 may terminate, when the verification property is not satisfied, model checking at that time. The model search unit 22 generates result information including a result that the verification property is not satisfied and a counter example indicating the result as a specific example.

Next, a data structure of an execution path generated by the model search unit 22 in the present example embodiment will be described. The execution path includes an array (or a data structure equivalent the array) which includes execution path elements as elements. The execution path element is defined by a set of four-piece of ("st", "tr", "Backtrack", and "Done"). The term "st" represents a state of the network model at a certain time. The term "tr" represents a transition made from the state "st". The term "Backtrack" is a set of transitions. The "Backtrack" represents a set of transitions made from the state "st" on backtracking. The term "Done" is a set of transitions, The "Done" represents a set of transitions made from the state "st" in past searches. A difference set obtained by subtracting set of "Done" from set of "Backtrack" represents transitions to be executed in backtracking from the state "st" but not executed yet.

Next, a data structure of a transition will be described. The transition is defined by a set of seven-piece of ("node", "type", "send", "recv", "port", "install", "apply"). The term "node" represents a terminal, switch, and controller operated in the transition. The "type" represents a type (a value representing any one of transitions made by the above-described six types of operations) of the transition. The "send" represents a set of packets or control messages transmitted in the transition. The "recv" represents packets or control messages received in the transition. The "port" represents the reception communication port where the packets or the control messages received in the transition have been stored. The "install" represents flow entry installed in the transition. The "apply" represents a flow entry applied in the transition. Transition data according to the data structure is generated, when a state transition is make in a search executed by the model search unit 22, by appropriately setting a value of each field in accordance with a content of the transition.

The data set determination processing unit 23 executes concolic processing. The concolic processing includes processing for determining, by use of a concolic technique, a data set including representative values of data used in a transition. It is assumed that the concolic technique includes a technique for determining a set of data used in a transition on the basis of symbolic execution (or another technique for dividing data range) of a program. The data set determination processing unit 23 may execute concolic processing by applying a known concolic technique.

Specifically, the data set determination processing unit 23 determines, for example, in a transition with transmission of packets, a set of representative values of packets used in the transition using concolic processing. Such a data set is a set of packets such that when the transition is executed using respective packets that are elements of the data set supplied as inputs, transitions based on all operation patterns of nodes operating in the transition can be executed.

The re-search control unit 24 receives an execution path from the model search unit 22 and analyzes a dependence relation and a happens-before relation between two transitions on the execution path.

The re-search control unit 24 generates a backtrack point on the execution path on the basis of the analysis results. The re-search control unit 24 generates a difference from a concolic processing result as a data set to be used in a transition with data use in a re-search from the backtrack point. The re-search control unit 24 controls the model search unit 22 to execute the re-search using the difference from the concolic processing result from the backtrack point.

The dependence relation represents a relation established in two transitions. Intuitively, when change of execution orders of two transitions causes changes in results after these transitions in a state transition system, a dependence relation is established (there is a dependence relation) between the two transitions. Alternatively, in a case where one of two transition becomes executable or not executable by executing the other of two transitions, a dependence relation is established (there is a dependence relation) between the two transitions. Generally, a condition where a dependence relation "is not established" between transitions "t1" and "t2" is defined as follows:

1: When a transition "t1" can be executable in a state s1 and the state transition from a state "s1" to a state "s2" is executed by the transition "t1", the transition "t2" is executable in both of the state "s1" and the state "s2" or is not executable in both of them.

2: In a case where the transitions "t1" and "t2" in the state "s1" are executable, if a destination state of the transition "t2" from a destination state of the transition "t1" from the state "s1" is "s2", a destination state of the transition "t1" from a destination state of the transition "t2" from the state "s1" is also "s2".

However, a cost for analyzing whether above-described general dependence relation is established is high. Therefore, in the present example embodiment, by considering specifications of the above-described network and an algorism of DPOR, the dependence relation is defined as follows.

A node operating in the transition t1 and a node operating in the transition t2 are the same node.

In the present example embodiment, it is assumed that the dependence relation based on such a definition is referred to as a "normal dependence relation". The re-search control unit 24 analyzes, in accordance with this definition, the normal dependence relation between two transitions.

The re-search control unit 24 analyzes a concolic dependence relation between two transitions, in addition of analysis of a normal dependence relation. It is assumed that the concolic dependence relation represents a dependence relation in which a change of a result of concolic processing is considered. In model checking that handles data in a concolic manner (i.e. concolic processing is executed), it is necessary to consider a dependence relation in which a change of a result of concolic processing is considered, in addition to the above-described normal dependence relation. A condition where a concolic dependence relation is established is defined as follows.

Any one of a transition "t1" and a transition "t2" is "a transition using data based on a result of concolic processing" and the other is "a transition that affects the result of the concolic processing."

In the present example embodiment, the verification object is a network model, and therefore the re-search control unit 24 analyzes a concolic dependence relation in accordance with the following definition.

Any one of the transition "t1" and the transition "t2" is "a transition by packet transmission of a terminal" and the other is "a state transition by program execution of a controller."

The re-search control unit 24 analyzes a happens-before relation between two transitions, in addition to the normal dependence relation and the concolic dependence relation. The happens-before relation represents an execution order relation between transitions always established on a certain model. For example, assuming a case of executing transitions that transmit and receive a certain message "m" in the above-described network model. In this case, a transition "t1" that transmits the message "m" always happens before a transition "t2" that receives the message "m". In this manner, the execution order relation between transitions always established from a causal relation on a model is referred to as the happens-before relation. The happens-before relation in which the transition "t1" always happens before the transition "t2" is described as "t1→t2." In the present example embodiment, the happens-before relation is defined as follows by considering above-described specifications of the network model and the algorism of DPOR.

1: When a packet or a control message transmitted by a transition "t1" and a packet or a control message received by a transition "t2" are the same, "t1→t2".

2: When a flow entry installed by a transition "t1" and a flow entry applied by a transition "t2" are the same, "t1→t2".

3: A packet or a control message "pm1" received by a transition "t1" and a packet or a control message "pm2" received by a transition "t2" are stored on the same reception communication port "q". In addition, when a transition "t3" having stored the "pm1" on the "q" and a transition "t4" having stored the "pm2" on the "q" indicates that "t3→t4", "t1→t2".

4: When "t1→t2" and "t2→t3", "t1→t3".

The re-search control unit 24 analyzes the normal dependence relation, the concolic dependence relation, and the happens-before relation defined as defined above. The re-search control unit 24 controls, on the basis of the analysis results, backtracking of a search of the network model by the model search unit 22.

The re-search control unit 24 controls, for example, a search of the network model by the model search unit 22, while executing backtracking on the basis of the normal dependence relation and the happens-before relation. For the control of the search based on the normal dependence relation and the happens-before relation, a known technique may be applied. The re-search control unit 24 may apply a technique such as DPOR or DPOR-DS described in NPL 2 or 3, for example.

The re-search control unit 24 controls a search of the network model by the model search unit 22 while executing backtracking on the basis of the concolic dependence relation and the happens-before relation. It is assumed that among two transitions having a concolic dependence relation, one transition by packet transmission of a terminal is represented as "t1" and the other transition by program execution of a controller is represented as "t2". In this case, the re-search control unit 24 determines a state before the transition "t1" as the backtrack point. The re-search control unit 24 generates, as described below, a difference from the concolic processing result as a set of packets used when executing a transition "t1'", which represents packet transmission by the same terminal as for the transition "t1" in a re-search from the backtrack point. Specifically, the re-search control unit 24 first creates a data set which is obtained by a result of concolic processing for a transition "t1'" when orders of the transition "t1" and the transition "t2" are temporarily switched,. The re-search control unit 24 may generate a data set as a difference from a concolic processing result, by excluding a packet already used in the transition "t1" from the data set created.

[Description of Operation]

An operation of the model checking apparatus 2 configured as described above will be described with reference to corresponding drawings. First, an outline of the operation of the model checking apparatus 2 is illustrated in FIG. 5.

Figure 5:
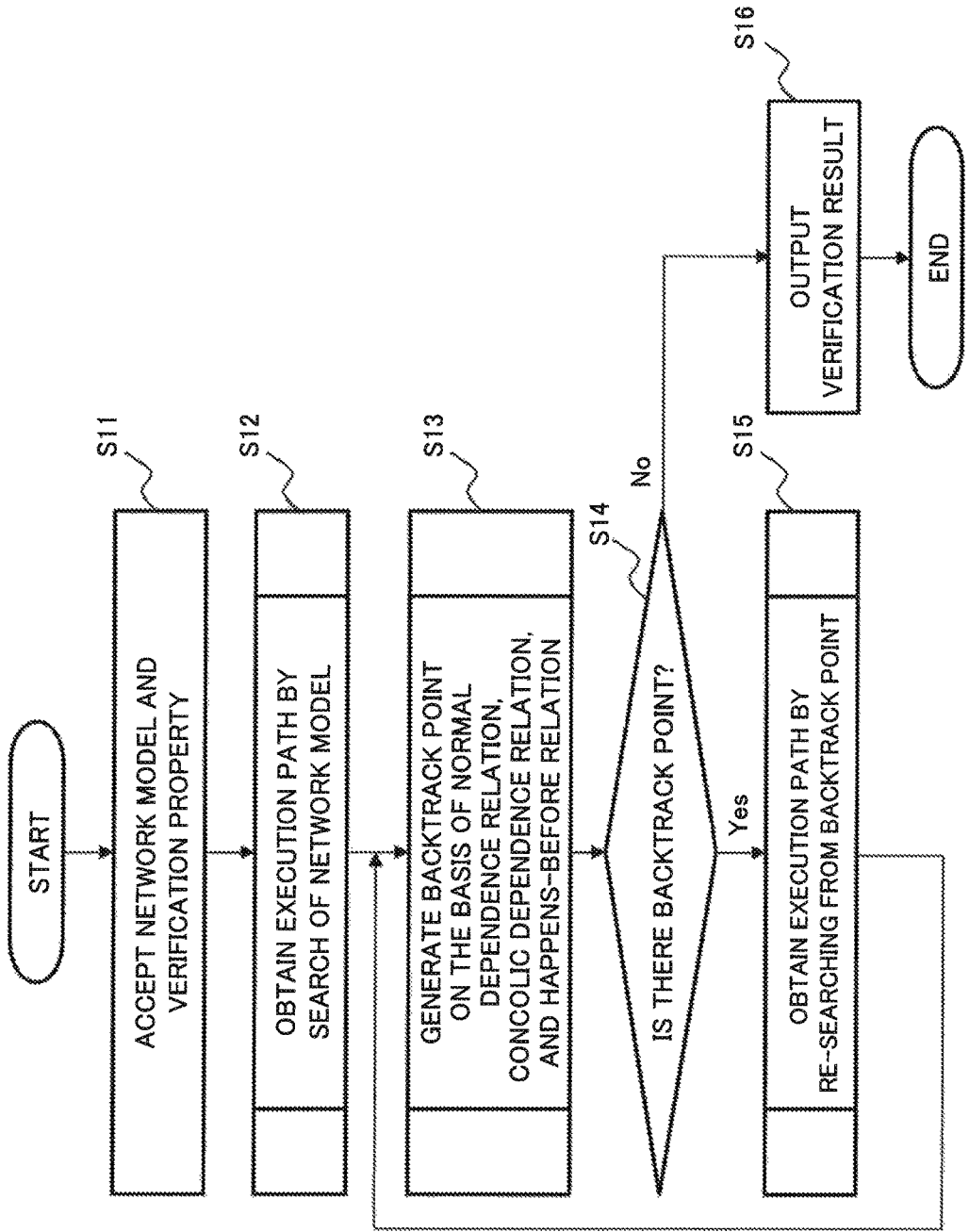
FIG. 5 is a flowchart illustrating an outline of an operation of the model checking apparatus as the second example embodiment of the present invention.

In FIG. 5, first, the verification information acceptance unit 21 accepts verification information including a network model and a verification property (step S11).

The model search unit 22 causes the network model to make a state transition and generates any execution path (step S12). Details of this step will be described later.

The re-search control unit 24 analyzes the normal dependence relation, the concolic dependence relation, and the happens-before relation on the execution path. The re-search control unit 24 generates a backtrack point on the execution path on the basis of the analysis results and generates the execution path including the backtrack point (step S13). Details of this step will be described later.

The model search unit 22 causes, when there are backtrack points on the execution path (Yes in step S14), the network model to make a state transition again from the deepest (last) backtrack point. The model search unit 22 generates a new execution path by a re-search (step S15).

The model search unit 22 repeats operations of step S13 to S15 for the newly generated execution path.

When there is no backtrack point for which re-search has not been executed on an execution path (No in step S14), the verification result output unit 15 provides a verification result (step S16). Specifically, the model search unit 22 may output a verification result including a success or failure of a verification property, and a counter example indicating the result when the verification property is not satisfied.

As described above, the operation of the model checking apparatus 2 is terminated.

In the following, details of the execution path generation operation in step S12 will be described with reference to FIG. 6.

Figure 6:
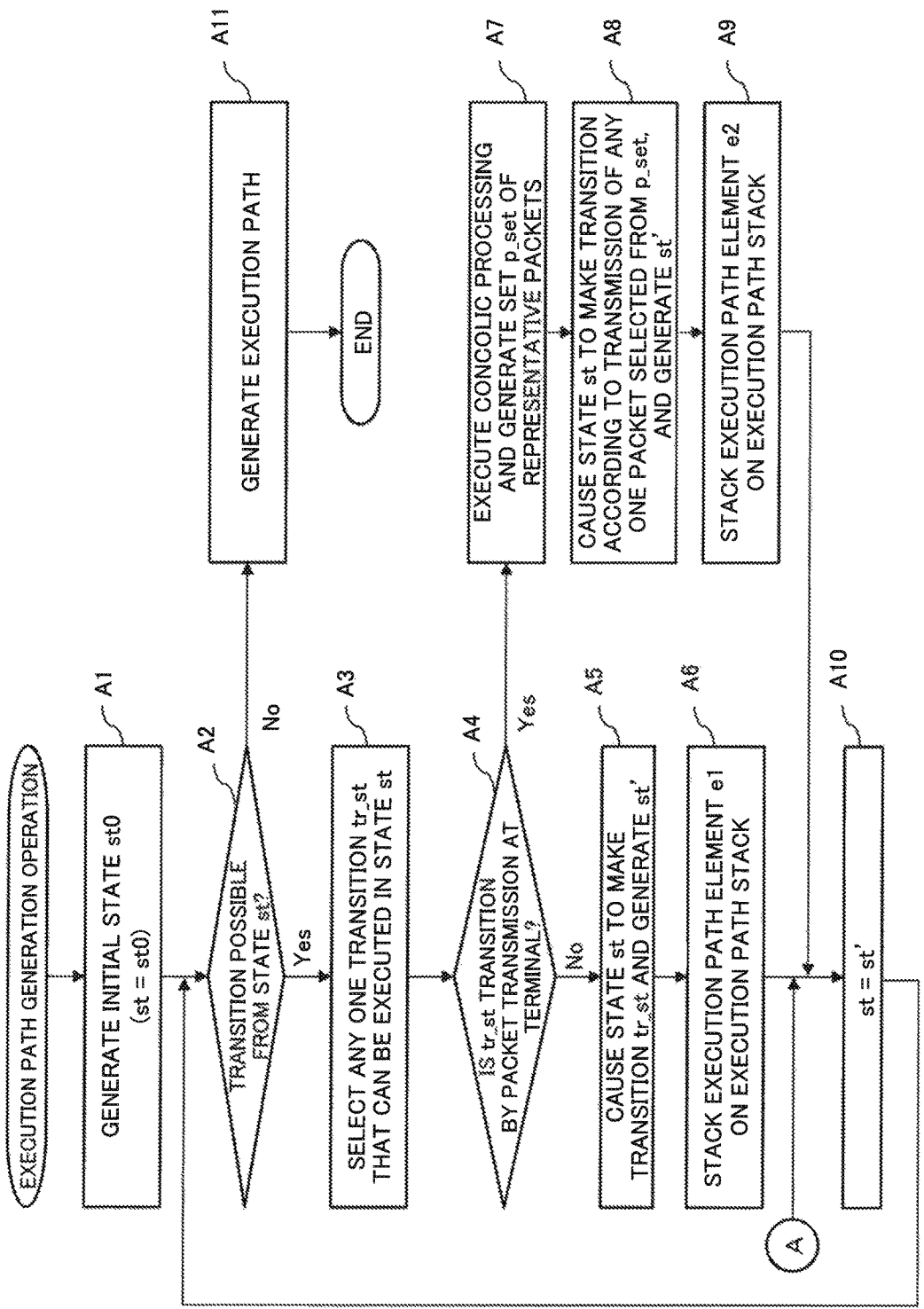
FIG. 6 is a flowchart illustrating details of an execution path generation operation of the model checking apparatus as the second example embodiment of the present invention.

In FIG. 6, first, the model search unit 22 generates an initial state "st0" of the network model included in verification information. the model search unit 22 sets a state as "st=st0" (step A1).

The model search unit 22 determines whether there are one or more transitions that is executable in the state "st" (step A2).

When there are one or more executable transitions, the model search unit 22 selects any one transition "tr_st" among the transitions that is executable in the state "st" (step A3).

The model search unit 22 determines whether the selected transition "tr_st" is "a transition by packet transmission of a terminal" (step A4).

When the transition is not "a transition by packet transmission of a terminal," the model search unit 22 causes the state "st" to make the transition "tr_st" and generates a next state "st" (step A5).

The model search unit 22 stacks a new execution path element "e1 =(st, tr_st, { }, {tr_st})" onto an execution path stack and moves to step A10 (step A6).

The execution path stack is a stack for storing a process of an execution path being currently searched and an element of the stack includes an execution path element.

On the other hand, when the transition "tr_st" is "a transition by packet transmission of a terminal" in step A4, the data set determination processing unit 23 executes concolic processing for the state "st". Thereby, the data set determination processing unit 23 determines a data set "p_set" of representative packets which can be transmitted in the transition tr_st (step A7).

The concolic processing determines, by symbolic execution, a set "p_set" of packets capable of specifying all operation patterns for an operation corresponding to an inquiry message from the switch among operations of the controller defined in the network model. However, a content of the concolic processing is not limited thereto. The data set determination processing unit 23 may divide data range by considering all flow entries installed on each switch in the network model and thereby determine a set of packets capable of specifying all operation patterns, for example.

The model search unit 22 selects any one representative packet "pm" from elements "p1", "p2", . . . , "pn" of the data set "p_set". The model search unit 22 causes the state st to make a transition "tr_st_m" by use of the selected representative packet "pm" and generates a next state "st" (step A8). The transition "tr_st_m" is "a transition by packet transmission at a terminal" that transmits the representative packet "pm".

The model search unit 22 stacks a new execution path element "e2 =(st, tr_st_m, tr_st_set, {tr_st_m})" onto the execution path stack and proceed to step A10 (step A9).

In this step, the model search unit 22 generates, as described below, a "tr_st_set" as a "Backtrack" of the new execution path element "e2". Specifically, the model search unit 22 sets, as "a p_set", a data set in which the already used packet "pm" is excluded from the data set "p-set". The model search unit 22 generates a set "tr$_{13}$ st_set" of transitions in which the "send" (transmission packet) of the transition "tr_st_m" is replaced with each element ("p1", "p2", ..., "pm−1", "pm+1", ..., "pn") of the "p_set'". In other words, elements of the "tr_st_set" are "tr_st_1", "tr_st_2", ..., "tr_st_m−1", "tr_st_m+1", ..., "tr_st_n". In addition, the "send" of the "tr_st_1" is "p1", the "send" of the "tr_st_2" is "p2", and then the send of the "tr_st_n" is "pn".

The model search unit 22 sets the state as "st=st" (step A10) and repeats the operations from step A2.

In step A2, when there is no transition that can be made in the state "st", the model search unit 22 generates the execution path using contents of the execution path stack at that time (step A11) and terminates the execution path generation operation.

Details of the backtrack point generation operation in step S13 will be described with reference to FIG. 7.

Figure 7:
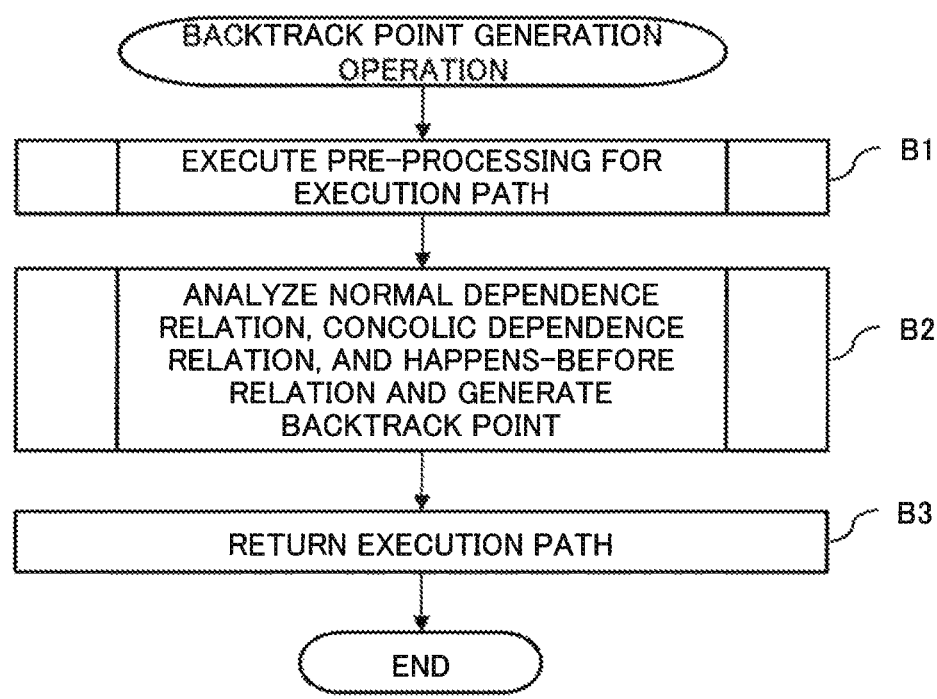
FIG. 7 is a flowchart illustrating an outline of a backtrack point generation operation of the model checking apparatus as the second example embodiment of the present invention.

In FIG. 7, first, the re-search control unit 24 executes pre-processing for analyzing the happens-before relation for the execution path (step B1). Details of this step will be described later.

The re-search control unit 24 analyzes the normal dependence relation, the concolic dependence relation, and the happens-before relation. The re-search control unit 24 generates a backtrack point on the execution path on the basis of the analysis results (step B2). Details of this step will be described later.

The re-search control unit 24 returns the execution path where the backtrack point has been generated to the model search unit 22 (step B3) and terminates the backtrack point generation operation.

Details of the pre-processing in step B1 will be described with reference to FIG. 8.

In this operation, the re-search control unit 24 finds, for each element on the execution path to be analyzed, an execution path element including a transition (that always happens first) having a happens-before relation with a transition of the element. The re-search control unit 24 prepares, for each execution path element, a data structure (a happens-before set). The happens-before set includes a set of execution path elements including a transition having the happens-before relation with a transition of an execution path element.

Figure 8:
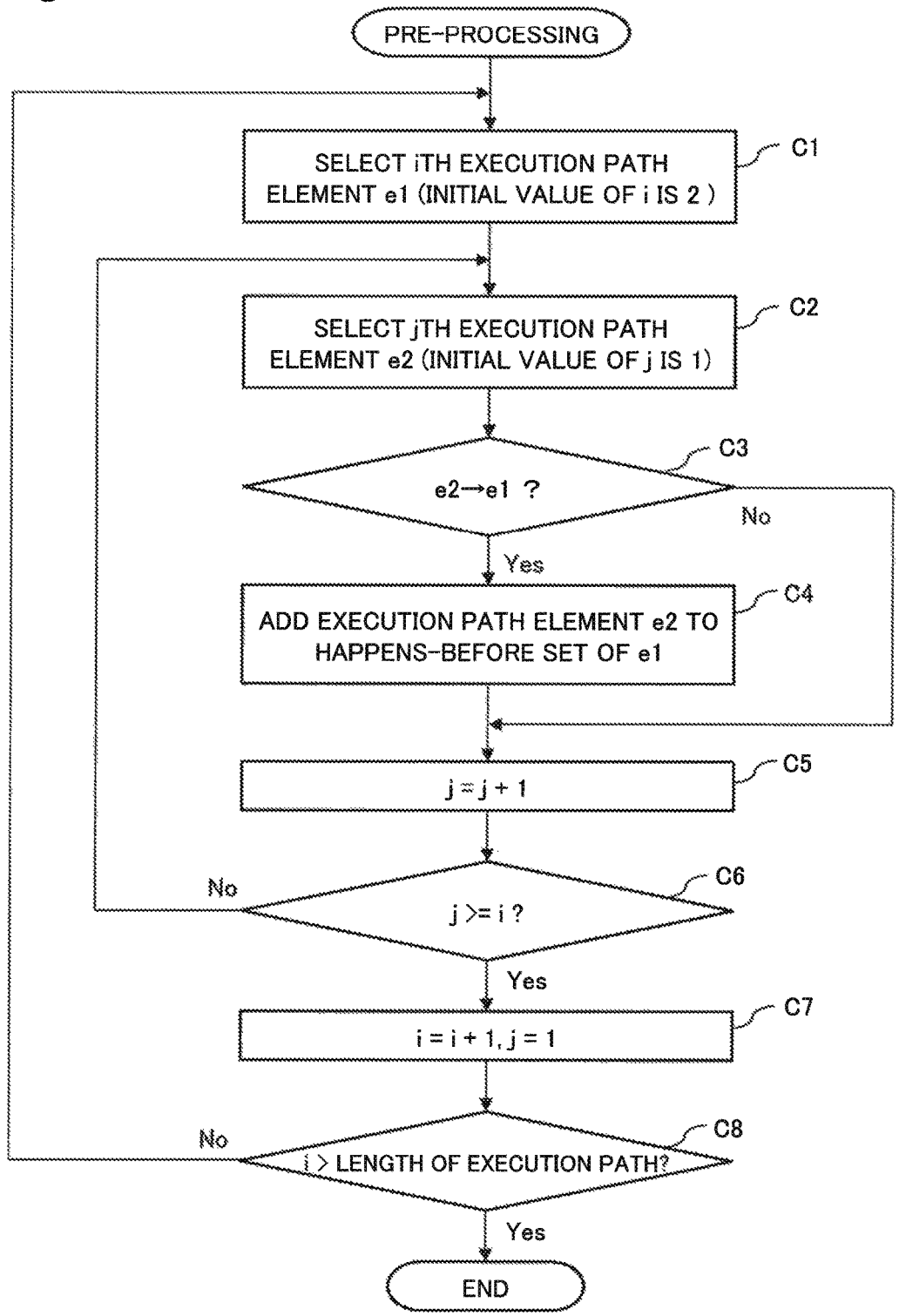
FIG. 8 is a flowchart illustrating details of pre-processing executed for backtrack point generation of the model checking apparatus as the second example embodiment of the present invention.

In FIG. 8, first, the re-search control unit 24 selects an ith execution path element "e1" from the execution path to be analyzed (step C1). The "i" is set to 2, when first executing this step.

The re-search control unit 24 selects a "j"-th execution path element "e2" (step C2). The "j" is set to 1, when first executing this step.

The re-search control unit 24 compares a transition of the execution path element "e1" and a transition of the execution path element "e2". The re-search control unit 24 confirms whether "a transition of the execution path element e2→a transition of the execution path element e1" (a happens-before relation) is established (step C3).

The operation of step C3 will be described in detail. In step C3, first, the re-search control unit 24 determines whether the reception message "recv" of a transition of the execution path element "e1" is included in a transmission message set "send" of the execution path element "e2". When the "recv" of "e1" is included in the "send" of "e2", the re-search control unit 24 determines that there is the happens-before relation (transition of "e2"→transition of "e1"). When the "recv" of "e1" is not included in the "send" of "e2", the re-search control unit 24 determines whether a flow entry applied in the transition of the execution path element "e1" and a flow entry applied in the transition of the execution path element "e2" are matched with each other. In a case that these flow entries are matched, the re-search control unit 24 determines that there is the happens-before relation (transition of "e2"→transition of "e1"). In a case that these flow entries are not matched, the re-search control unit 24 determines whether reception communicate ports used in the transitions of the execution path elements "e1" and "e2" are matched with each other. In a case that these reception communicate ports are not matched, the re-search control unit 24 determines that there is no happens-before relation. In a case of hat these reception communicate ports are matched, the re-search control unit 24 searches an execution path element "e3" and an execution path element "e4" from the execution path to be analyzed. The execution path element "e3" includes a transition having the "send" including the reception message "recv" of the transition of the execution path element "e1". The execution path element "e4" includes a transition having the "send" including the reception message "recv" of the transition of the execution path element "e2". The re-search control unit 24 confirms whether the "e4" is included in the happens-before set of the execution path element "e3". When the "e4" is included in the happens-before set, the re-search control unit 24 determines that there is the happens-before relation (transition of "e2"→transition of "e1"). When the "e4" is not included in the happens-before set, the re-search control unit 24 determines that there is no happens-before relation.

A case where the re-search control unit 24 determines that "a transition of the execution path element "e2"→a transition of the execution path element "e1"" (a happens-before relation) is established in step C3, will be described. In this case, the re-search control unit 24 adds the execution path element "e2" and all execution path elements included in the happens-before set of the execution path element "e2", to the happens-before set (which is vacant at first) of the execution path element "e1" (step C4).

After the execution of step C4 or in step C3, when it is determined there is no happens-before relation, the re-search control unit 24 increases a value of "j" by 1 (step C5).

The re-search control unit 24 repeats, when a value of "j" is not equal to or more than "i" (No in step C6), steps C2 to C5. When a value of "j" is equal to or more than "i" (Yes in step C6), the re-search control unit 24 increases a value of "i" by 1 and sets the value of "j" as 1 (step C7).

The re-search control unit 24 repeats, when a value of "i" is not larger than a length of the execution path to be analyzed (No in step C8), steps C1 to C7. When the value of "i" becomes larger than the length of the execution path to be analyzed (Yes in step C8), the re-search control unit 24 terminates the pre-processing.

Next, details of the dependence relation analysis operation in step B2 will be described with reference to FIG. 9.

Figure 9:
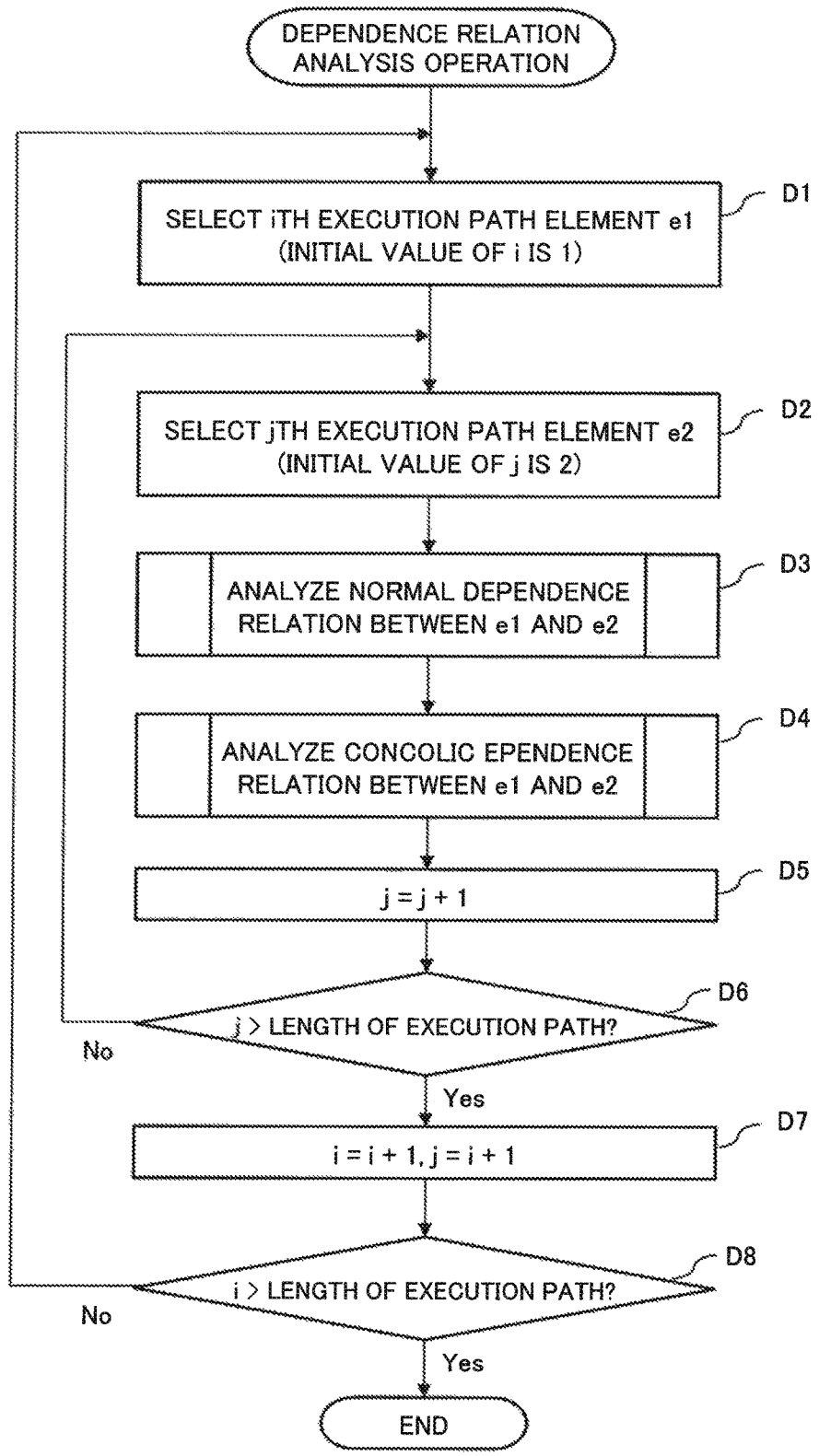
FIG. 9 is a flowchart illustrating details of a dependence relation analysis operation of the model checking apparatus as the second example embodiment of the present invention.

In FIG. 9, first, the re-search control unit 24 selects an "i"-th execution path element "e1" from the execution path to be analyzed (step DO. The "i" is set to 1 when first executing this step.

The re-search control unit 24 selects a "j"-th execution path element "e2" from the execution path to be analyzed (step D2). The "j" is set to 2 whn first executing this.

The re-search control unit 24 analyzes the normal dependence relation with respect to a transition of the execution path element "e1" and a transition of the execution path element "e2". The re-search control unit 24 generates a backtrack point on the execution path on the basis of the analysis result of the normal dependence relation (step D3). Details of this step will be described later.

The re-search control unit 24 analyzes the concolic dependence relation with respect to the transition of the execution path element "e1 " and the transition of the execution path element "e2". The re-search control unit 24 generates the backtrack point on the execution path on the basis of the analysis result of the concolic dependence relation (step D4). Details of this step will be described later.

The re-search control unit 24 increases a value of "j" by 1 (step D5). The re-search control unit 24 repeats steps D2 to D5 while the value of "j" is equal to or less than a length of the execution path to be analyzed (No in step D6).

The re-search control unit 24 increases, when the value of "j" is larger than a length of the execution path to be analyzed (Yes in step D6), a value of "i" by 1 and sets the value of "j" as "i+1" (step D7).

The re-search control unit 24 repeats steps D1 to D7 while the value of "i" is equal to or less than a length of the execution path (No in step D8). When the value of "i" is larger than a length of the execution path (Yes in step D8), the re-search control unit 24 terminates the dependence relation analysis operation.

Next, details of the analysis operation of the normal dependence relation in step D3 will be described with reference to FIG. 10.

Figure 10:
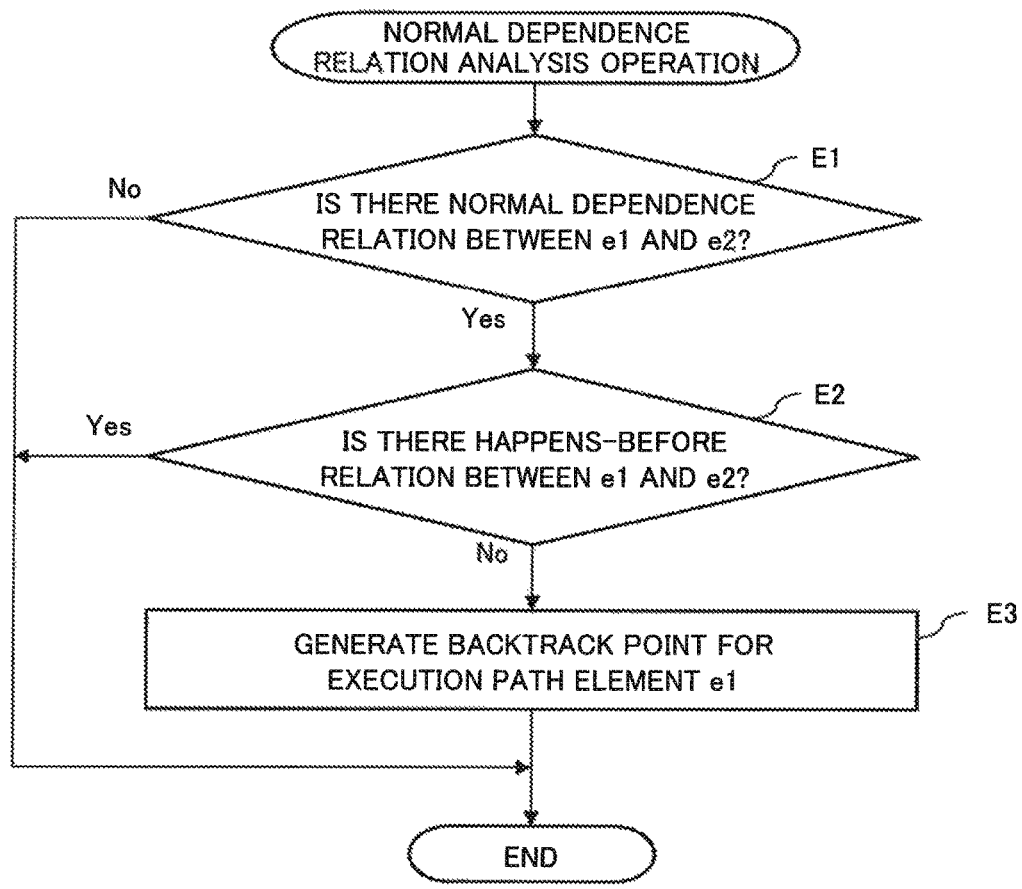
FIG. 10 is a flowchart illustrating details of a normal dependence relation analysis operation of the model checking apparatus as the second example embodiment of the present invention.

In FIG. 10, first, the re-search control unit 24 compares a transition of the execution path element "e1" and a transition of the execution path element "e2" and checks whether there are the normal dependence relation and the happens-before relation therebetween, respectively (steps E1 and E2).

Specifically, the re-search control unit 24 may determine, when operation nodes of the transitions of the execution path elements "e1" and "e2" are matched with each other, that there is the normal dependence relation therebetween. Further, the re-search control unit 24 determines that there is no happens-before relation when the execution path element "e1" is not included in the happens-before set of the execution path element "e2".

A case in which the re-search control unit 24 determines that, between a transition of the execution path element "e1" and a transition of the execution path element "e2", there is the normal dependence relation (Yes in step E1) and there is no happens-before relation (No in step E2), will be described. In this case, the re-search control unit 24 generates a backtrack point for the execution path element "e1" (step E3).

Specifically, the re-search control unit 24 selects the most anterior execution path element "e3" in the execution path to be analyzed among execution path elements included in the happens-before set of the execution path element "e2". The re-search control unit 24 adds a transition of the execution path element "e3" to a backtrack set "Backtrack" of the execution path element "e1" and generates the backtrack point.

On the other hand, a case in which the re-search control unit 24 determines that, between the transition of the execution path element "e1 " and the transition of the execution path element "e2", there is no normal dependence relation (No in step E1) or there is the happens-before relation (Yes in step E2), will be described. In this case, the re-search control unit 24 does not execute processing for generating a backtrack point.

As described above, the re-search control unit 24 terminates the analysis operation of the normal dependence relation.

Next, details of the analysis operation of the concolic dependence relation in step D4 will be described with reference to FIG. 11.

Figure 11:
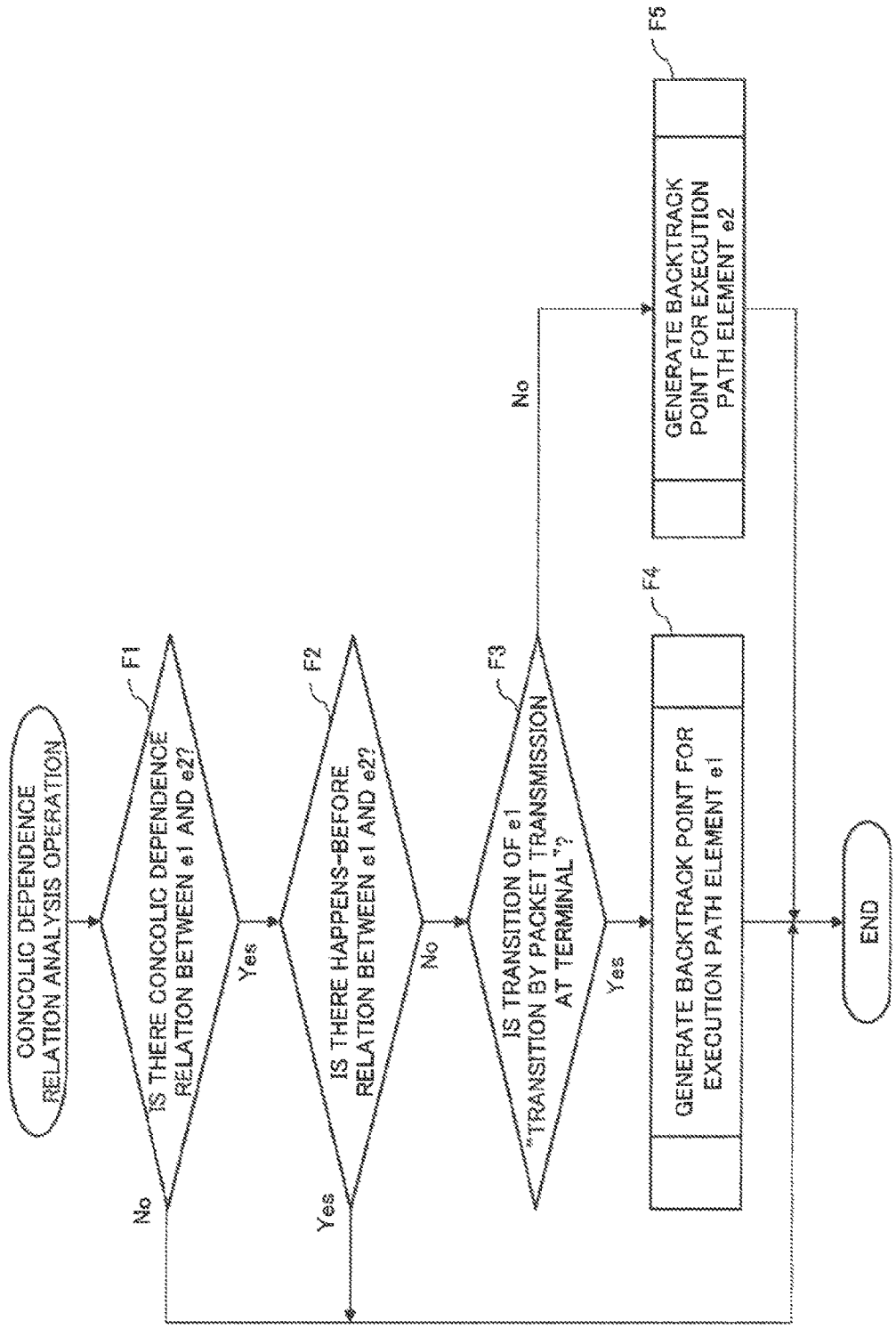
FIG. 11 is a flowchart illustrating details of a concolic dependence relation analysis operation of the model checking apparatus as the second example embodiment of the present invention.

In FIG. 11, first, the re-search control unit 24 compares a transition of the execution path element "e1" and a transition of the execution path element "e2" and checks whether there are the concolic dependence relation and the happens-before relation therebetween, respectively (steps F1 and F2).

Specifically, the re-search control unit 24 determines that there is the concolic dependence relation when any one of the two transitions is "a transition by packet transmission of a terminal" and the other is "a state transition by program execution of a controller." Further, the re-search control unit 24 determines that there is no happens-before relation when the execution path element "e1" is not included in the happens-before set of the execution path element "e2".

A case in which the re-search control unit 24 determines that, between a transition of the execution path element "e1" and a transition of the execution path element "e2", there is the concolic dependence relation (Yes in step F1) and there is no happens-before relation (No in step F2), will be described. In this case, the re-search control unit 24 determines whether the transition of the execution path element "e1" is "a transition by packet transmission of a terminal" (step F3).

In step F3, the re-search control unit 24 generates a backtrack point for the execution path element "e1" (step F4), when determining that the transition of the execution path element "e1" is "a transition by packet transmission of a terminal". Details of this step will be described later.

On the other hand, a case in which the re-search control unit 24 determines that the transition of the execution path element "e1" is not "a transition by packet transmission of a terminal" in step F3, will be described. In this case, the transition of the execution path element "e2" is "a transition by packet transmission of a terminal." In this case, the re-search control unit 24 generates the backtrack point for the execution path element "e2" (step F5). Details of this step will be described later.

A case in which the re-search control unit 24 determines that, between the transition of the execution path element "e1" and the transition of the execution path element "e2", there is no concolic dependence relation (No in step F1) or there is the happens-before relation (Yes in step F2) will be described. In this case, the re-search control unit 24 does not execute processing for generating the backtrack point.

As described above, the re-search control unit 24 terminates the analysis operation of the concolic dependence relation.

Next, details of the backtrack point generation operation for the execution path element "e1" in step F4 will be described with reference to FIG. 12.

There is the concolic dependence relation between a transition "tr1" of the execution path element "e1" ("i"-th element) selected in step D1 and a transition "tr2" of the execution path element "e2" ("j"-th element) selected in step D2. The transition "tr1" is "a transition by packet transmission of a terminal."

Figure 12:
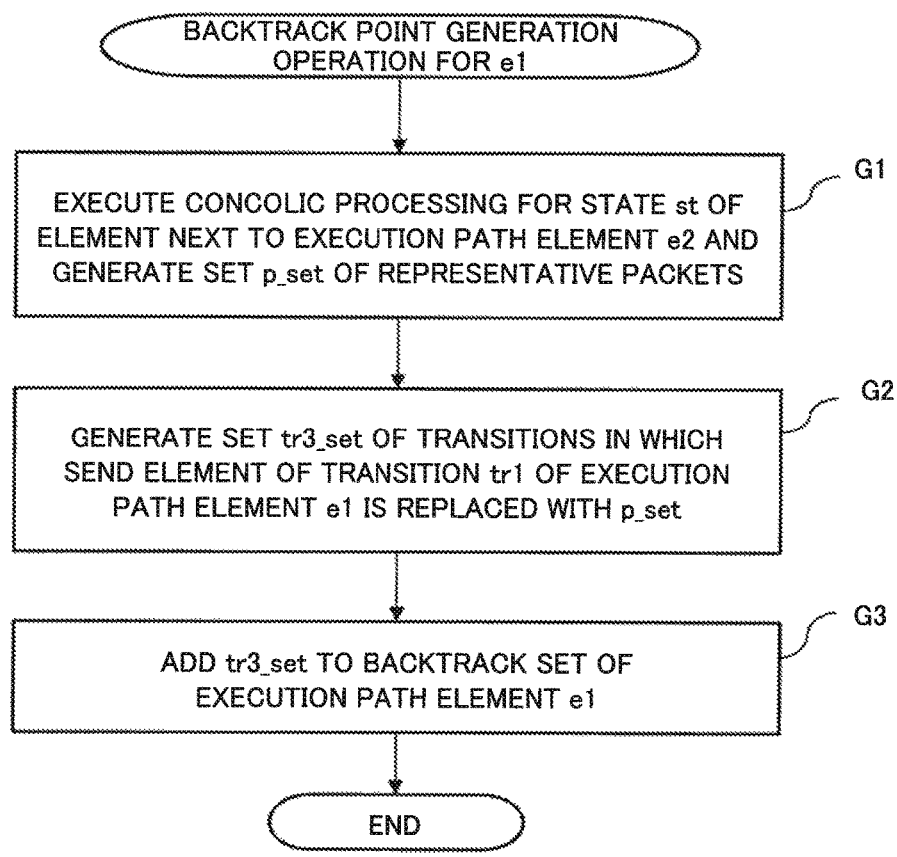
FIG. 12 is a flowchart illustrating details of a backtrack point generation operation for an execution path element of the model checking apparatus as the second example embodiment of the present invention.

In FIG. 12, first, the re-search control unit 24 executes concolic processing for a state st of an execution path element "e4" ("j+1"-th element) next to the execution path element "e2". Thereby, the re-search control unit 24 determines a set "p_set" of representative packets (step G1).

The set "p_set" of representative packets determined in this manner is a result of concolic processing for a state "st" after making a transition "tr2". In other words, the set "p_set" of representative packets determined in this manner is equivalent to a set of results of concolic processing for a state before making the transition "tr1", when the transition "tr2" has been temporarily made before the transition "tr1".

The re-search control unit 24 generates a set "tr3_set" of transitions (step G2). The set "t3_set" of transitions is a set of transitions in which the "send" (transmission packet) of the transition "tr1" is replaced with each element ("p1", "p2", . . . , "pn") of the "p_set". In other words, elements of the "tr3_set" are "tr3$_{13}$", "tr3$_{\_2}$", . . . , and "tr3_n", and the send of the "tr3$_{13\ 1}$" is "p1" and the "send" of the "tr3$_{\_2}$" is "p2", and then the "send" of the "tr3_n" is "pn".

The re-search control unit 24 generates a backtrack point for the execution path element "e1" (step G3). Specifically, the re-search control unit 24 adds the "tr3_set" to the backtrack set "Backtrack" of the execution path element "e1" (executes a sum operation of sets) and generates the backtrack point.

As described above, the re-search control unit 24 terminates the backtrack point generation operation for the execution path element "e1".

Next, details of the backtrack point generation operation for the execution path element "e2" in step F5 will be described with reference to FIG. 13.

There is the concolic dependence relation between a transition "tr1" of the execution path element "e1" ("i"-th element) selected in step D1 and a transition "tr2" of the execution path element "e2" ("j"-th element) selected in step D2. The transition tr2is "a transition by packet transmission of a terminal."

Figure 13:
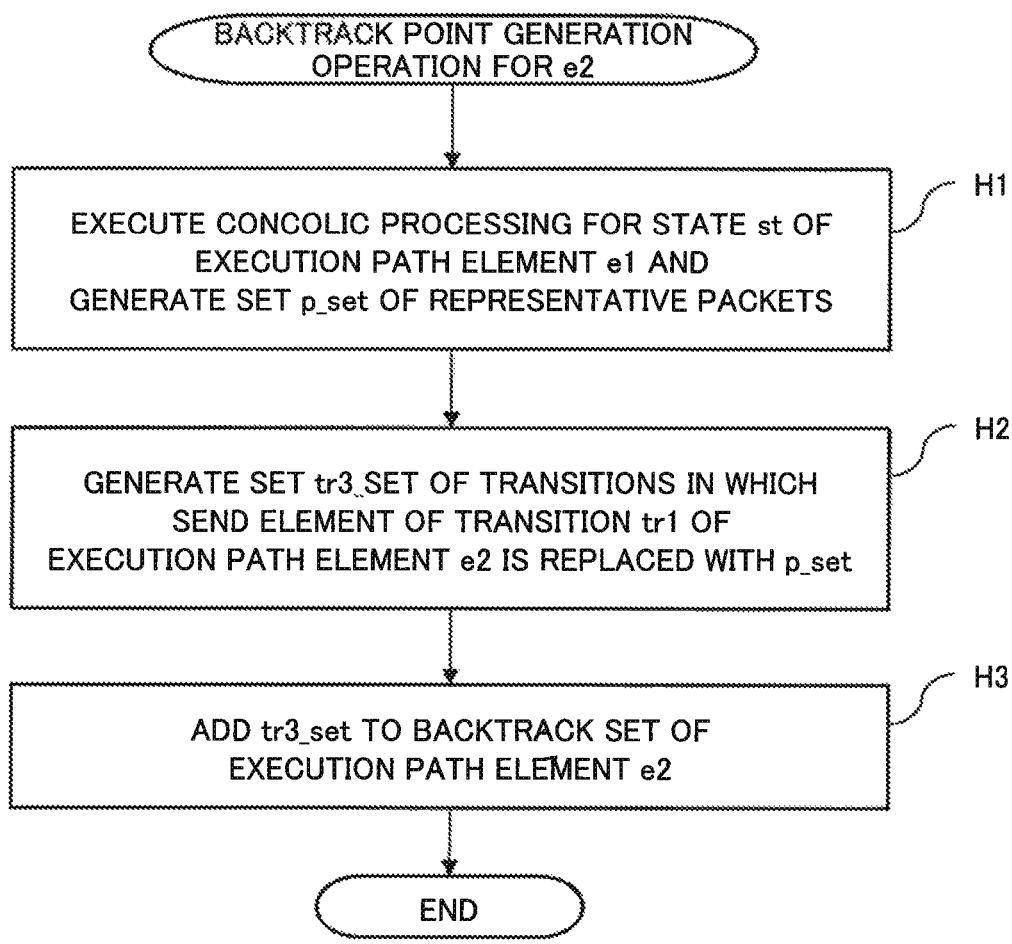
FIG. 13 is a flowchart illustrating details of a backtrack point generation operation for another execution path element of the model checking apparatus as the second example embodiment of the present invention.

In FIG. 13, first, the re-search control unit 24 executes concolic processing for a state "st" of the execution path element "e1". Thereby, the re-search control unit 24 determines a set "p_set" of representative packets (step H1).

The set "p_set" of representative packets determined in this manner is a result of concolic processing for a state "st" before making the transition "tr1". In other words, the set "p_set" of representative packets determined in this manner is equivalent to a set of results of concolic processing for states before making the transition "tr2", when the transition "tr2" has been temporarily made before the transition "tr1".

The re-search control unit 24 generates a set "tr3_set" of transitions (step H2). The set "tr3_set" of transitions is a set of transitions in which the "send" (transmission packet) of the transition "tr2" is replaced with each element ("p1", "p2", . . . , "pn") of the "p_set". In other words, elements of the "tr3_set" are "tr3_1", "tr3_2", . . . , and "tr3_n". The "send" of the "tr3_1" is "p1" and the send of the "tr3_2" is "p2", and then the "send" of the "tr3_n" is "pn".

The re-search control unit 24 generates the backtrack point for the execution path element "e2" (step H3). Specifically, the re-search control unit 24 adds the "tr3 set" to the backtrack set "Backtrack" of the execution path element "e2" (executes a sum operation of sets) and generates a backtrack point.

As described above, the re-search control unit 24 terminates the backtrack point generation operation for the execution path element e2.

The concolic processing in step G1 and step H1 is the same as the concolic processing in step S12 (step A7). In step G3 and step H3, the re-search control unit 24 handles transitions for backtrack as a set and executes a sum operation. Thereby, the re-search control unit 24 is able to control the model search unit 22 so as not to make transitions for backtrack redundantly.

Next, details of the backtrack operation in step S15 will be described with reference to FIG. 14.

Figure 14:
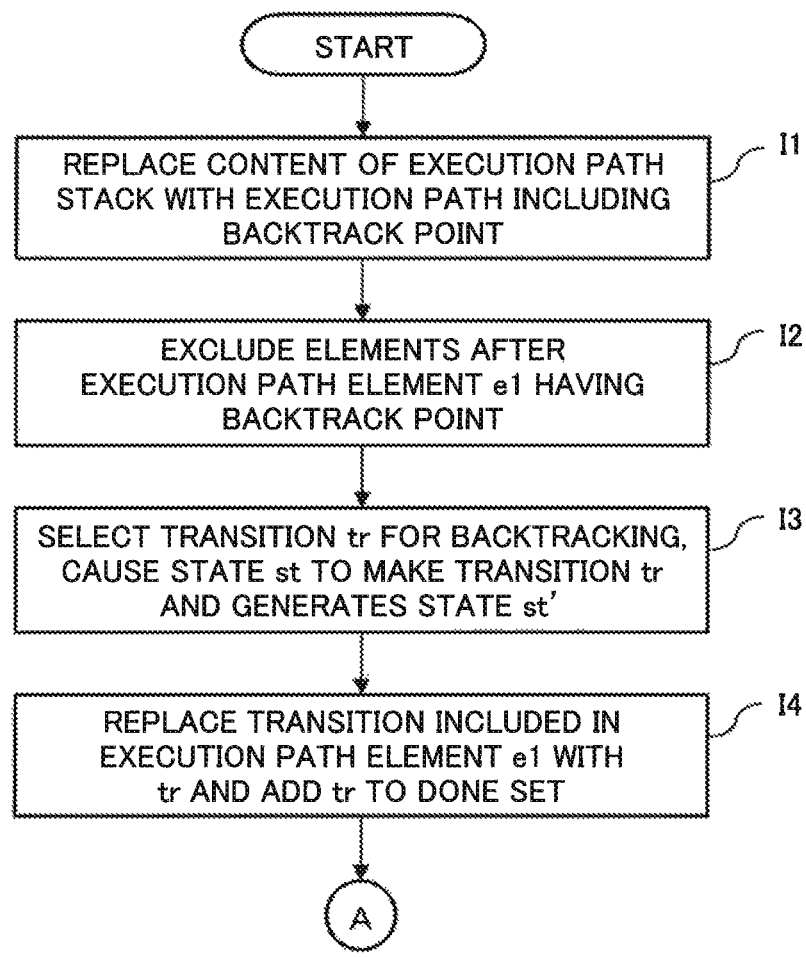
FIG. 14 is a flowchart illustrating details of a re-search operation from a backtrack point of the model checking apparatus as the second example embodiment of the present invention.
Figure 15:
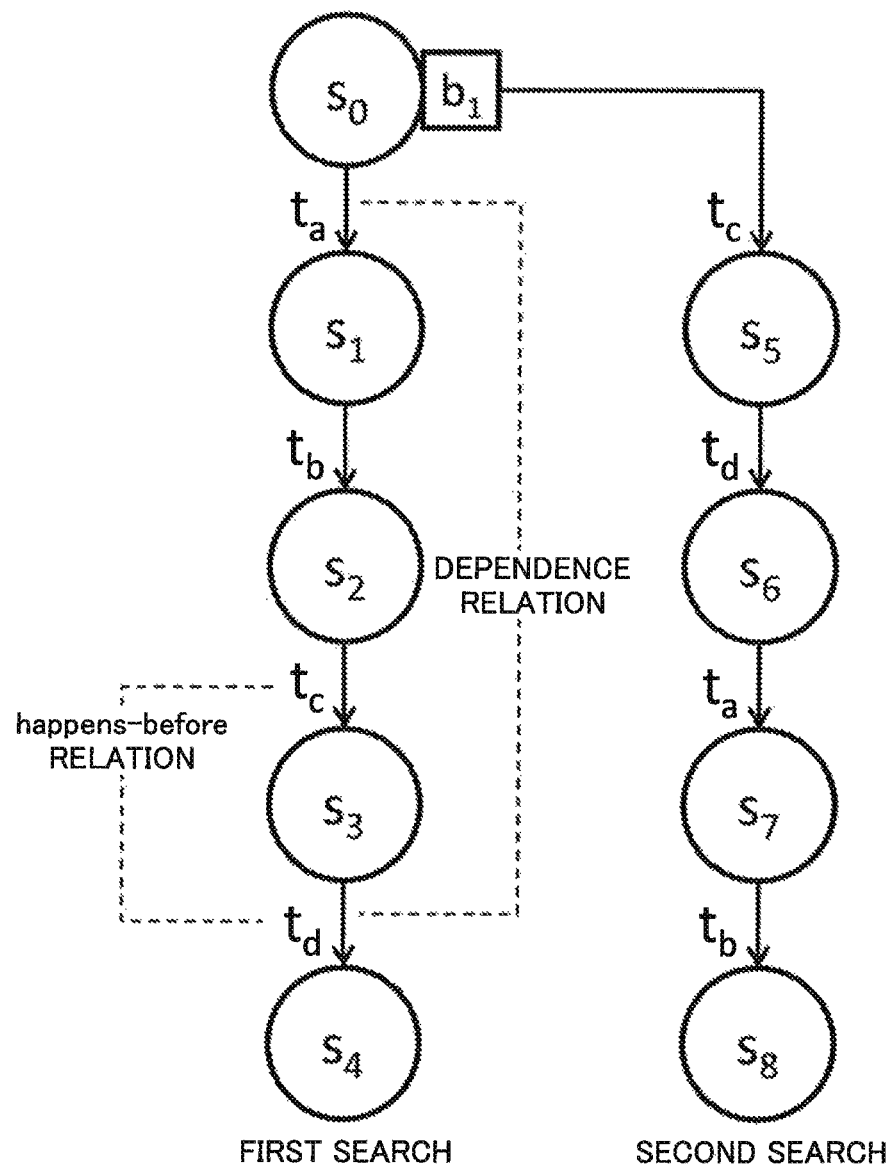
FIG. 15 is a schematic diagram illustrating a re-search in a related technique.
Figure 16:
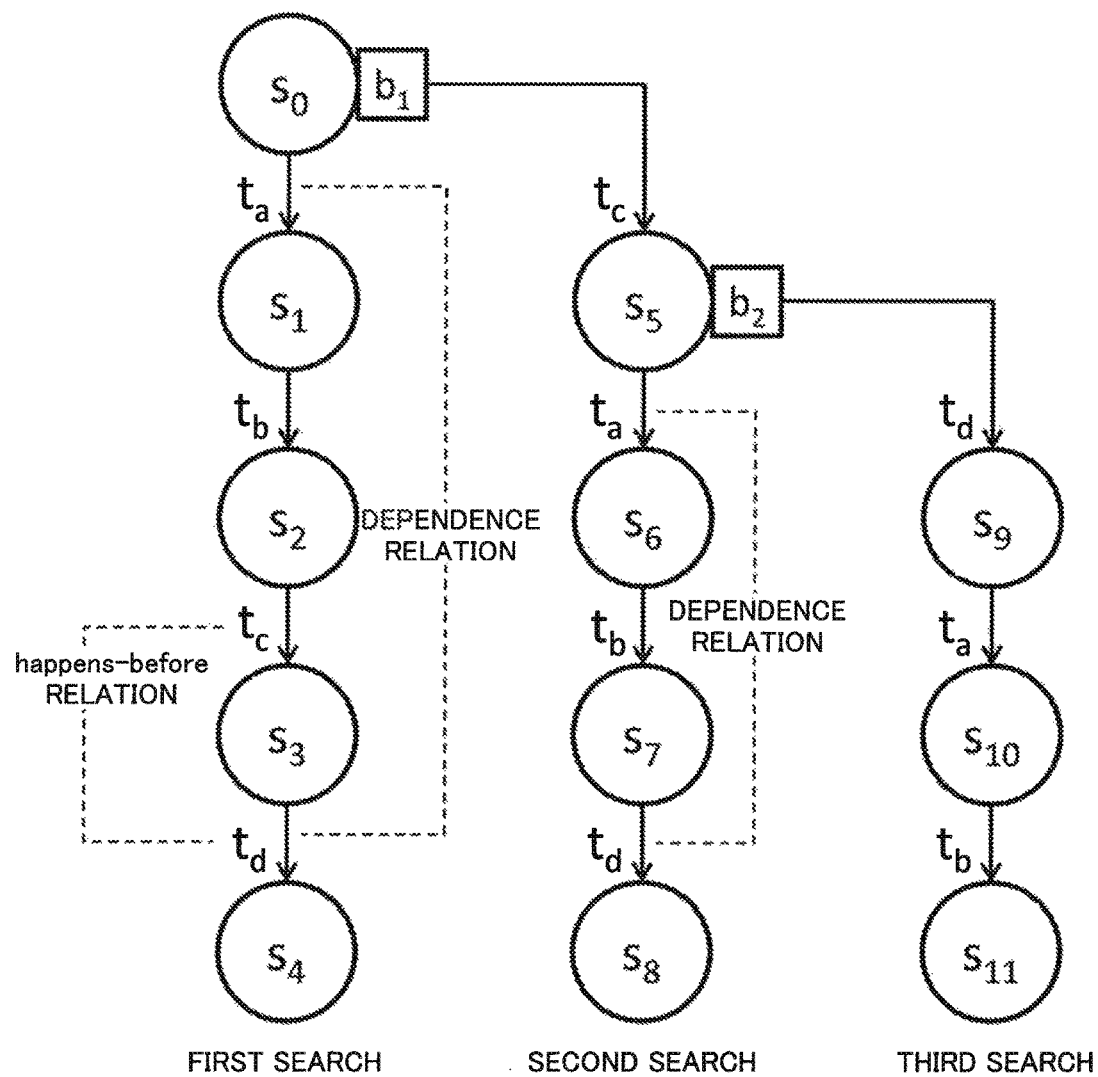
FIG. 16 is a schematic diagram illustrating a re-search in a case that first transition sequence from a backtrack point is not specified in a related technique.
Figure 17:
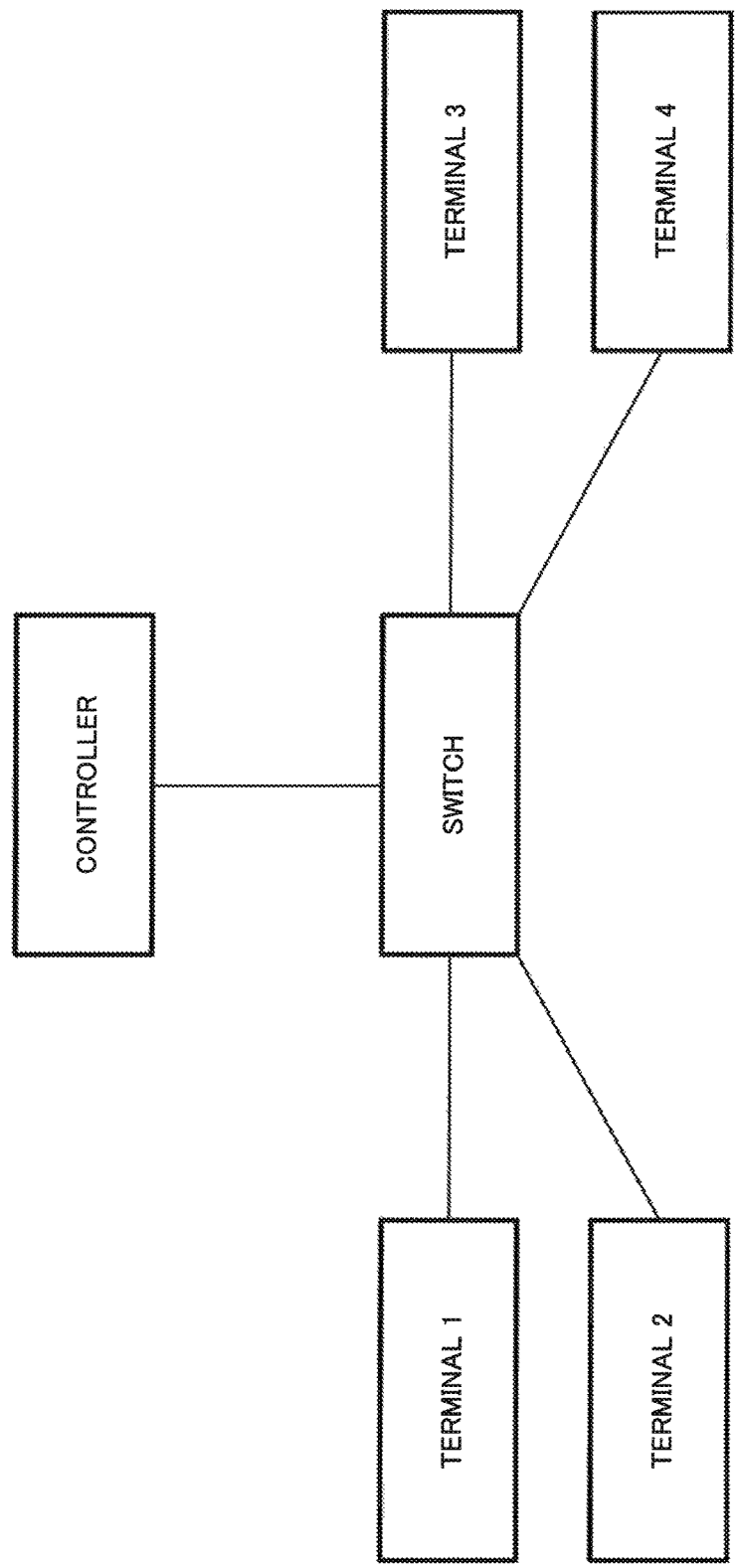
FIG. 17 is a diagram illustrating a network configuration of a verification object for illustrating a problem of a related technique.
Figure 18:
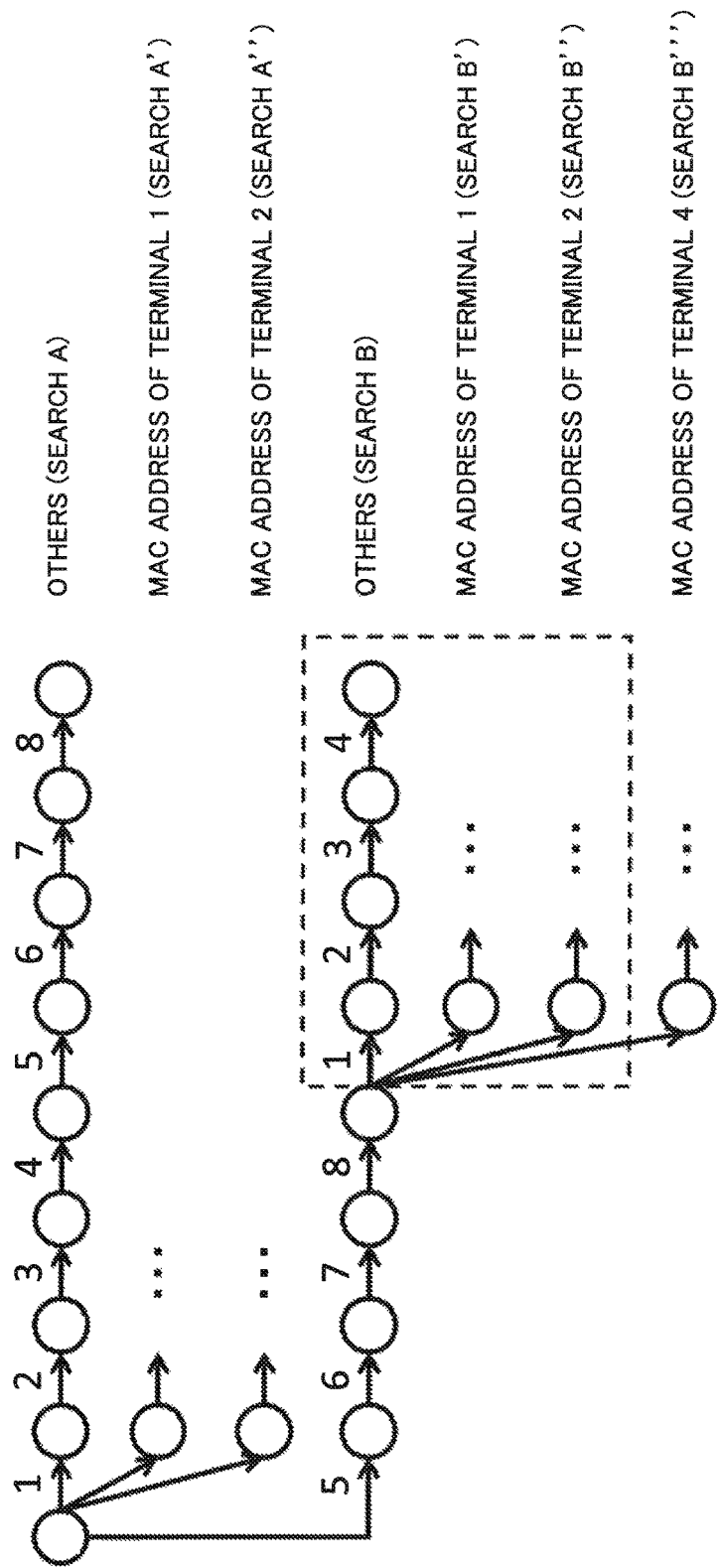
FIG. 18 is a schematic diagram for illustrating needless searches executed in a related technique.

In FIG. 14, first, the model search unit 22 replaces a content of the execution path stack with the execution path including the backtrack point generated in step S13 (step I1).

The model search unit 22 searches, on the execution path stack, the last execution path element "e1" of execution path elements having the backtrack point. The model search unit 22 removes execution path elements (except the "e1") after the "e1" from the execution path stack (step I2).

The execution path element having the backtrack point is an execution path element in which a difference set obtained by subtracting the "Done" from the backtrack set "Backtrack" is not vacant. The execution path element "e1" is set as the last execution path element of the execution path stack.

The model search unit 22 selects any one transition "tr" which is included in the backtrack set "Backtrack" of the last execution path element "e1" of the execution path stack and is not included in the "Done". The model search unit 22 causes a state "st" included in the execution path element "e1" to make the transition "tr" and generates a next state "st" (step I3).

The model search unit 22 replaces a transition includes in the execution path element "e1" with the "tr" and adds the "tr" to the "Done" (step I4).

Thereafter, the model search unit 22 proceeds to step A10 of FIG. 6 and executes an operation of the step and the following steps in the same manner as the execution path generation operation illustrated in FIG. 6.

The description of the backtrack generation operation of the model search unit 22 is concluded as described above.

[Description of Advantageous Effects]

In the following, advantageous effects of the second example embodiment of the present invention will be described.

The model checking apparatus as the second example embodiment of the present invention is able to reduce redundant searches without causing needless searches and execute efficient searches, when applying DPOR (or an extended technique thereof) while handling data in concolic manner in model checking of a network model.

The reason is that the model search unit causes a state of the network model to make a transition and obtains any execution path, and the re-search control unit controls a re-search from a backtrack point in which the concolic dependence relation is considered. Specifically, the re-search control unit generates backtrack information corresponding to a difference from a result of concolic processing in a transition with concolic processing in the re-search. The backtrack information includes a "Backtrack" set in which a sum operation is executed for a data set determined by concolic processing when orders of transitions having the concolic dependence relation are temporarily switched, and a "Done" set indicating already used data. The model search unit executes the re-search using any data selected from data obtained by subtracting the "Done" set from the "Backtrack" set, in the transition with concolic processing in the re-search from the backtrack point. In addition, the re-search control unit generates the backtrack point in a state immediately before the transition with concolic processing between transitions having the concolic dependence relation, and the re-search control unit does not switch orders of the transitions.

Thereby, it is not necessary for the present example embodiment to execute needless searches using data equivalent to past searches from the viewpoint of verification, while executing backtracking in which the concolic dependence relation is considered. Therefore, efficient searches can be realized.

In the present example embodiment, while specific specifications of a network model, specific specifications of a state transition, and a specific data structure of various pieces of data representing an execution path, a transition, and the like, have been explained, however, the present example embodiment is not limited thereto. The example embodiments of the present invention are also applicable to cases using other state transition models representing a network controlled by a network control technique, other transition definitions, and various types of data structures associated with the definitions.

Further, in the present example embodiment, an example, in which the re-search control unit determines that there is the concolic dependence relation between transitions when one of the transitions is a transition with packet transmission of a terminal and the other of the transition is a transition with program execution by a controller, is explained. Not limited to above, the re-search control unit may determine the concolic dependence relation on the basis of another criterion.

Further, in the above-described example embodiments of the present invention, the verification information acceptance unit may include a function of providing template information for supporting input of verification information by the user. For example, the verification information acceptance unit may supply a typical template so as to be selectable, as a verification property included in verification information to an output device. Thereby, the user is able to input verification information by selecting a desired template. Thereby, the present example embodiment is able to reduce work load of creating verification information by the user. As a result, the present example embodiment is able to improve efficiency of the overall verification.

In the above-described example embodiments of the present invention, an example in which each of the function blocks of a model checking apparatus is realized by a CPU for executing a computer program stored on a memory, is mainly explained. Not limited to above, a part or all of the respective function blocks or a combination thereof may be realized by dedicated hardware.

Further, in the above-described example embodiments of the present invention, a function block of the model checking apparatus may be realized by being distributed into a plurality of apparatuses.

In the above-described example embodiments of the present invention, a computer program of an operation of the model checking apparatus described with reference to each flowchart may be stored on a storage apparatus (storage medium) of a computer, as a computer program of the present invention. The computer program may be load and executed by the CPU. In such a case, the present invention includes codes of the computer program or the storage medium.

Further, the above-described example embodiments can be appropriately combined and implemented.

The present invention has been explained using the above-described example embodiments as typical examples. However, the present invention is not limited to the above-described example embodiments. In other words, the present invention is applicable to various variations that can be understood by those skilled in the art, without departing from the scope of the present invention.

This application is based upon and claims the benefit of priority from Japanese patent application No. 2014-232865, filed on Nov. 17, 2014, the disclosure of which is incorporated herein in its entirety by reference.

REFERENCE SIGNS LIST

1 Model checking apparatus
2 Model checking apparatus
11, 21 Verification information acceptance unit
12, 22 Model search unit
13, 23 Data set determination processing unit
14, 24 Re-search control unit
15 Verification result output unit
1001 CPU
1002 Memory
1003 Output device
1004 Input device

The invention claimed is:

1. A model checking apparatus comprising:
processing circuitry that is configured to function as:
   a verification information acceptance unit that is configured to accept verification information representing a state transition model and a verification content for the state transition model;
   a model search unit that is configured to obtain an execution path by causing a transition in the state transition model;
   a data set determination processing unit that is configured to execute data set determination processing for determining a data set, the data set being a set of representative values of data used in a transition with data use in the state transition model;
   a re-search control unit that is configured to control the model search unit to use a data set in which data already used in a previous search in the transition with data use is excluded from the data set obtained by the data set determination processing in the transition with data use, when performing a re-search from a backtrack point based on a dependence relation relating to the data set determination processing between transitions on the execution path, wherein the re-search control unit is further configured to generate the backtrack point in a state immediately before a transition previously made among detected transitions by analyzing the dependence relation relating to the data set determination processing between the transitions on the execution path, wherein the re-search control unit further determines a data set in which the data already used in the previous search in the transition is excluded from the data set obtained by the data set determination processing, in the backtrack point, when generating the backtrack point by analyzing the dependence relation relating to the data set determination processing between the transitions on the execution path, and wherein the re-search control unit performs, in the transition with data use in the re-search, the re-search without switching orders of the transitions with the dependence relation relating to the data set determination processing, by use of a data set in which the data already used is excluded from data set obtained, by the data set determination processing, when temporarily switching the orders of the transitions having the dependence relation relating to the data set determination processing;
and
an output device that is configured to function as a verification result output unit in accordance with control by the processing circuitry, the verification result output unit being configured to provide a verification result of the verification content based on a search result of the model search unit according to the control of the re-search control unit.

2. The model checking apparatus according to claim 1, wherein
when, in a combination of any transitions on the execution path, one of the combination is a transition using data based on a result of the data set determination processing and the other of the combination is a transition that affects the result of the data set determination processing, the re-search control unit determines that the combination includes the dependence relation relating to the data set determination processing.

3. The model checking apparatus according to claim 2, wherein
when the state transition model represents a network including a switch configured to transfer a packet transmitted and received between terminals and a controller configured to control a transfer in the switch,
the re-search control unit determines, when in a combination of any transitions on the execution path, one of the combination is a transition with packet transmission by the terminal and the other of the combination is a transition with program execution by the controller, that the combination includes the dependence relation relating to the data set determination processing.

4. The model checking apparatus according to claim 1, wherein
when, in a combination of any transitions on the execution path, one of the combination is a transition using data based on a result of the data set determination processing and the other of the combination is a transition that affects the result of the data set determination processing, the re-search control unit determines that the combination includes the dependence relation relating to the data set determination processing.

5. The model checking apparatus according to claim 4, wherein
when the state transition model represents a network including a switch configured to transfer a packet transmitted and received between terminals and a controller configured to control a transfer in the switch,
the re-search control unit determines, when in a combination of any transitions on the execution path, one of the combination is a transition with packet transmission by the terminal and the other of the combination is a transition with program execution by the controller, that the combination includes the dependence relation relating to the data set determination processing.

6. A model checking method executed by a computer, the model checking method comprising:
accepting verification information representing a state transition model and a verification content for the state transition model;
obtaining an execution path by causing a transition in the state transition model;
analyzing, between transitions on the execution path, a dependence relation relating to data set determination processing for determining a data set, the data set being a set of representative values of data used in a transition with data use;
generating a backtrack point in a state immediately before a transition previously made among detected transitions by analyzing the dependence relation relating to the data set determination processing between the transitions on the execution path;
determining a data set in which the data already used in the previous search in the transition is excluded from the data set obtained by the data set determination processing, in the backtrack point, when generating the backtrack point by analyzing the dependence relation relating to the data set determination processing between the transitions on the execution path;
performing a re-search using the data set in which data already used in a previous search in the transition is excluded from the data set obtained by the data set determination processing in the transition with data use, when performing a re-search from the backtrack point based on the dependence relation relating to the data set determination processing;
performing in the transition with data use in the re-search, the re-search without switching orders of the transitions with the dependence relation relating to the data set determination processing, by use of a data set in which the data already used is excluded from data set obtained, by the data set determination processing, when temporarily switching the orders of the transition having the dependence relation relating to the data set determination processing; and
providing a verification result of the verification content based on the search result.

7. A non-transitory computer-readable storage medium storing a model checking program that causes a computer apparatus to execute:
processing for accepting verification information representing a state transition model and a verification content for the state transition model;
processing for obtaining an execution path by causing a transition in the state transition model;
processing for analyzing, between transitions on the execution path, a dependence relation relating to data set determination processing for determining a data set, the dataset being a set of representative values of data used in a transition with data use;
processing for generating a backtrack point in a state immediately before a transition previously made among detected transitions by analyzing the dependence relation relating to the data set determination processing between the transitions on the execution path;
processing for determining a data set in which the data already used in the previous search in the transition is excluded from the data set obtained by the data set determination processing, in the backtrack point, when generating the backtrack point by analyzing the dependence relation relating to the data set determination processing between the transitions on the execution path:
processing for performing a re-search using a data set in which data already used in a previous search in the transition is excluded from the data set obtained by the data set determination processing in the transition with data use, when performing a re-search from a backtrack point based on the dependence relation relating to the data set determination processing;

processing for performing, in the transition with data use in the re-search, the re-search without switching orders of the transitions with the dependence relation relating to the data set data set obtained, by the data set determination processing, when temporarily switching the orders of the transitions having the dependence relation relating to the data set determination processing; and processing for providing a verification result of the verification content based on the search result.

* * * * *

UNITED STATES PATENT AND TRADEMARK OFFICE
CERTIFICATE OF CORRECTION

PATENT NO. : 10,210,070 B2
APPLICATION NO. : 15/524316
DATED : February 19, 2019
INVENTOR(S) : Yutaka Yakuwa It is certified that error appears in the above-identified patent and that said Letters Patent is hereby corrected as shown below:

On the Title Page

Column 2, item (56) Other Publications, Line 1; Delete "Open Flow" and insert --OpenFlow-- therefor In the Specification Column 14, Description of Embodiments, Line 37; Delete ""my"" and insert --"mv"-- therefor Column 20, Description of Embodiments, Line 35; Delete ""st"" and insert --"st"-- therefor Column 20, Description of Embodiments, Line 64; Delete ""st"" and insert --"st"-- therefor Column 21, Description of Embodiments, Line 7; Delete ""a p_set"," and insert --"a p_set",-- therefor Column 21, Description of Embodiments, Line 9; Delete ""$tr_{13}$ st_set"" and insert --"tr_st_set"-- therefor Column 21, Description of Embodiments, Line 18; Delete ""st=st"" and insert --"st=st"-- therefor Column 22, Description of Embodiments, Line 66; Delete "DO." and insert --D1).-- therefor Column 25, Description of Embodiments, Line 16; Delete ""$tr3_{13}$", "tr3_2"," and insert --"tr3_1", "tr3_2",-- therefor Column 25, Description of Embodiments, Line 17; Delete ""$tr3_{13\_1}$" is "p1"" and insert --"tr3_1" is "p1"-- therefor Column 25, Description of Embodiments, Line 58; Delete ""tr3 set"" and insert --"tr3_set"-- therefor
Column 26, Description of Embodiments, Line 14; Delete "(step 12)." and insert --(step I2).-- therefor Signed and Sealed this
Thirtieth Day of July, 2019

Andrei Iancu
*Director of the United States Patent and Trademark Office*

CERTIFICATE OF CORRECTION (continued)
U.S. Pat. No. 10,210,070 B2

Column 26, Description of Embodiments, Line 28; Delete ""st" (step 13)." and insert --"st'" (step I3).-- therefor Column 26, Description of Embodiments, Line 31; Delete "(step 14)." and insert --(step I4).-- therefor In the Claims Column 30, Line 23; In Claim 6, after "performing", insert --,--

Column 30, Line 29; In Claim 6, delete "transition" and insert --transitions-- therefor Column 30, Line 60; In Claim 7, delete "path:" and insert --path;-- therefor Column 31, Line 4; In Claim 7, delete "data set data set" and insert --data set determination processing, by use of a data set in which the data already used is excluded from data set-- therefor